US012581058B2

(12) United States Patent
Xiu et al.

(10) Patent No.: US 12,581,058 B2
(45) Date of Patent: Mar. 17, 2026

(54) GEOMETRIC PARTITION MODE WITH MOTION VECTOR REFINEMENT

(71) Applicant: BEIJING DAJIA INTERNET INFORMATION TECHNOLOGY CO., LTD., Beijing (CN)

(72) Inventors: Xiaoyu Xiu, San Diego, CA (US); Che-Wei Kuo, San Diego, CA (US); Wei Chen, Beijing (CN); Hong-Jheng Jhu, San Diego, CA (US); Ning Yan, Beijing (CN); Yi-Wen Chen, San Diego, CA (US); Xianglin Wang, San Diego, CA (US); Bing Yu, Beijing (CN)

(73) Assignee: BEIJING DA JIA INTERNET INFORMATION TECHNOLOGY CO., LTD., Beijing (CN)

( * ) Notice: Subject to any disclaimer, the term of this patent is extended or adjusted under 35 U.S.C. 154(b) by 75 days.

(21) Appl. No.: 18/513,492

(22) Filed: Nov. 17, 2023

(65) Prior Publication Data

US 2024/0098250 A1 Mar. 21, 2024

Related U.S. Application Data

(63) Continuation of application No. PCT/US2022/029704, filed on May 17, 2022.
(Continued)

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/176* (2014.11); *H04N 19/46* (2014.11)

(58) Field of Classification Search
CPC .............. H04N 19/105; H04N 19/119; H04N 19/176; H04N 19/46; H04N 19/52;
(Continued)

(56) References Cited

U.S. PATENT DOCUMENTS

| | | | |
|---|---|---|---|
| 2020/0396448 A1 | 12/2020 | Furht et al. | |
| 2022/0295088 A1* | 9/2022 | Zhang | H04N 19/52 |
| 2023/0156190 A1* | 5/2023 | Robert | H04N 19/119 375/240.16 |

FOREIGN PATENT DOCUMENTS

| | | |
|---|---|---|
| WO | 2019072368 A1 | 4/2019 |
| WO | 2020031062 A1 | 2/2020 |

OTHER PUBLICATIONS

JPOA issued in Application No. 2023-571522 dated Dec. 3, 2024 with English translation, (5p).
(Continued)

*Primary Examiner* — Nam D Pham

(74) *Attorney, Agent, or Firm* — Arch & Lake LLp; Hao Tan; Shen Wang

(57) ABSTRACT

Methods and devices are provided for decoding a video block in GPM. The method includes: partitioning the video block into a first geometric partition and a second geometric partition; receiving a first template matching (TM) enable flag for the first geometric partition a second TM enable flag for the second geometric partition, the first TM enable flag indicating whether a uni-directional motion of the first geometric partition is refined by TM, and the second TM enable flag indicating whether a uni-directional motion of the second partition is refined by the TM; receiving a first merge GPM index for the first geometric partition and a second merge GPM index for the second geometric partition; constructing a uni-directional motion victor (MV) candidate list of the GPM; and generating a first uni-directional MV for the first geometric partition and a second uni-directional MV for the second geometric partition.

18 Claims, 7 Drawing Sheets

Related U.S. Application Data

(60) Provisional application No. 63/189,661, filed on May 17, 2021.

(51) Int. Cl.
    H04N 19/176     (2014.01)
    H04N 19/46     (2014.01)

(58) Field of Classification Search
    CPC .... H04N 19/56; H04N 19/543; H04N 19/139; H04N 19/70; H04N 19/513; H04N 19/573
    See application file for complete search history.

(56) References Cited

OTHER PUBLICATIONS

Ru-Ling Liao et al., "EE2-related: Combination of GPM and template matching", Joint Video Experts Team (JVET) of ITU-T SG 16 WP 3 and ISO/IEC JTC 1/SC 29, JVET-V0117-v2, 22nd Meeting, by teleconference, Apr. 20-28, 2021, (2p).

International Search Report of PCT Application No. PCT/US2022/029704 dated Aug. 30, 2022, (3p).

Xiaoyu Xiu et al., 'AHG12: Evaluation of GPM with MMVD for coding efficiency improvement over VVC', JVET-V0125_rl, Joint Video Experts Team (JVET) of ITU-T SG 16WP3 and ISO/IEC JTC 1/SC 29, 22nd Meeting, by teleconference, pp. 1-4, Apr. 23, 2021, (4p).

Ru-Ling Liao et al EE2-related: Combination of GPM and template matching1, JVET-V0117-v2, Joint Video Experts Team (JVET) of ITU-T SG16WP3and ISO/IEC JTC 1/SC 29 22nd Meeting, by teleconference, pp. 1-2, Apr. 22, 2021, (2p).

EPOA issued in Application No. 22805353.4 dated May 19, 2025, (11p).

Benjamin Bross et al., "Versatile Video Coding (Draft 10)", Joint Video Experts Team (JVET) of Itu-T Sg 16 WP 3 and ISO/IEC JTC 1/SC 29/WG 11, JVET-S2001-vH, 19th Meeting: by teleconference, Jun. 22-Jul. 1, 2020, (548p).

Chun-Chi Chen et al., "EE2-related: Extension of template matching to Affine, CIIP, GPM merge modes, and boundary sub-blocks", Joint Video Experts Team (JVET) of ITU-T SG 16 WP 3 and ISO/IEC JTC 1/SC 29, JVET-V0118-v1, 22nd Meeting, by teleconference, Apr. 20-28, 2021, (3p).

* cited by examiner

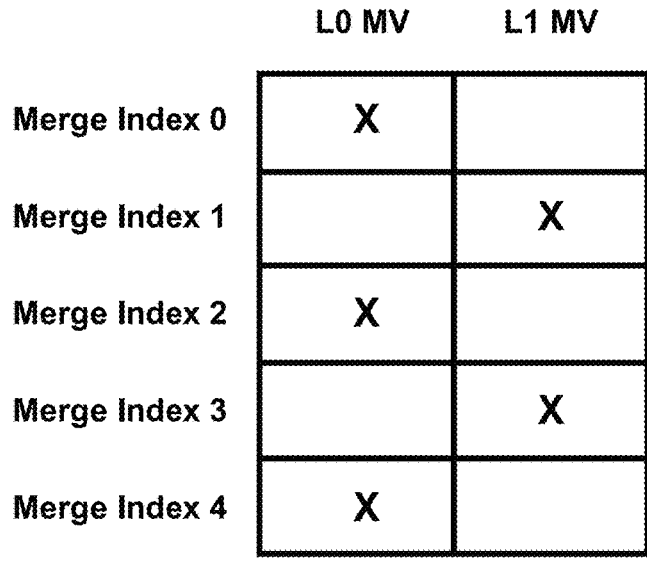
FIG. 5
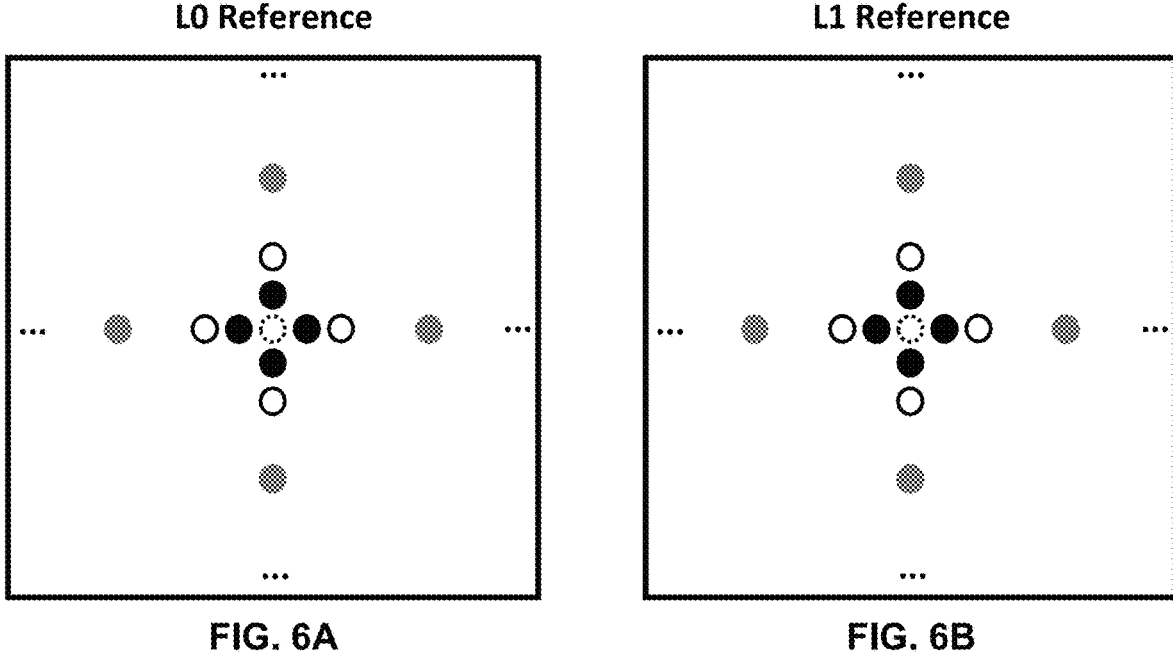
FIG. 6A                 FIG. 6B

Reference frame                                    Current frame

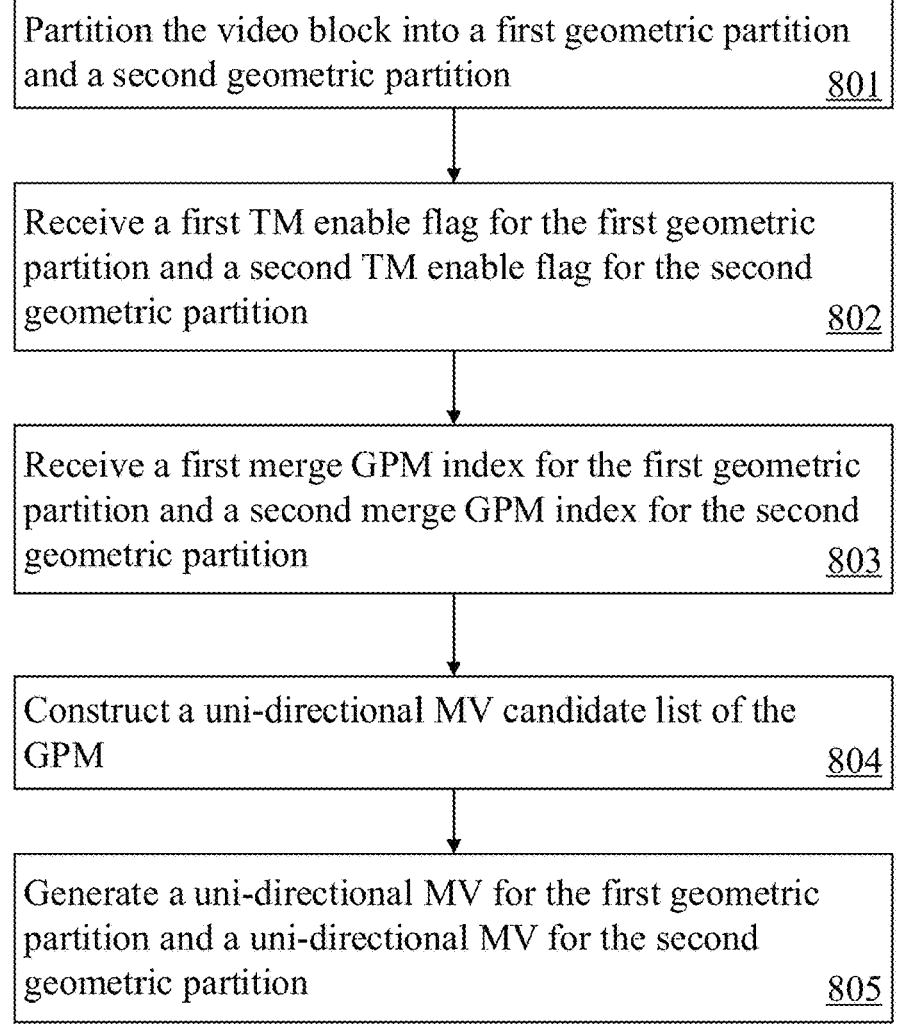

FIG. 7

Partition the video block into a first geometric partition and a second geometric partition     801

Receive a first TM enable flag for the first geometric partition and a second TM enable flag for the second geometric partition     802

Receive a first merge GPM index for the first geometric partition and a second merge GPM index for the second geometric partition     803

Construct a uni-directional MV candidate list of the GPM     804

Generate a uni-directional MV for the first geometric partition and a uni-directional MV for the second geometric partition     805

FIG. 8

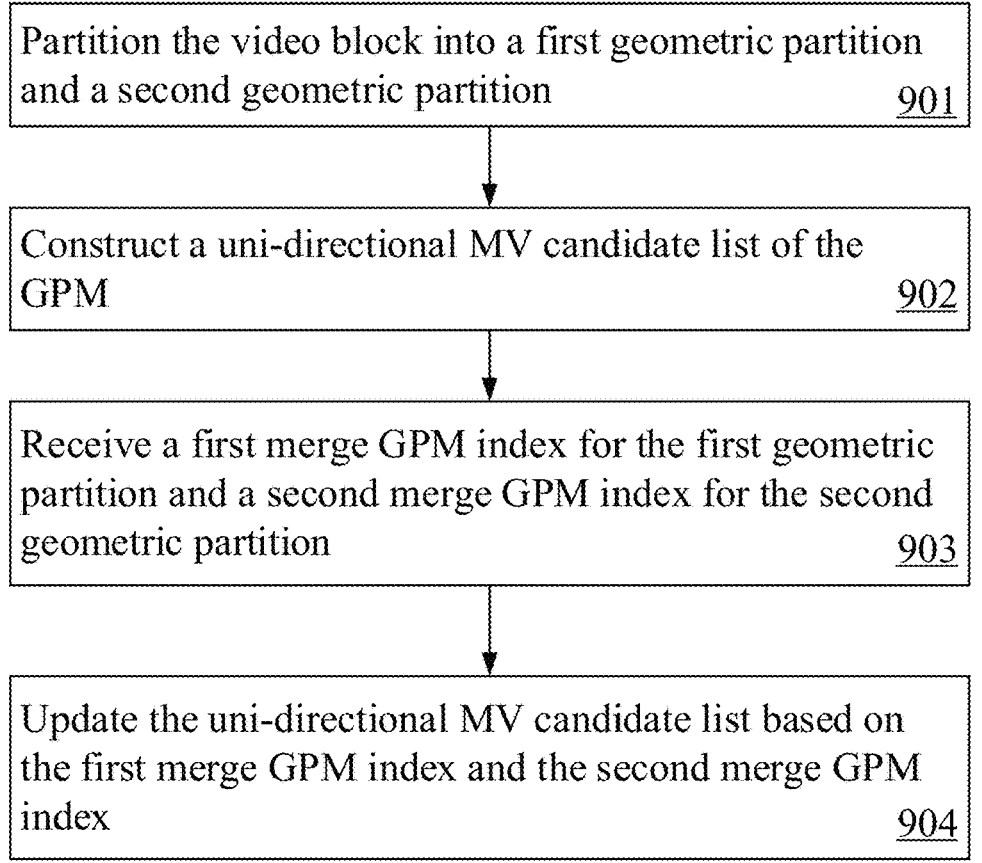

Partition the video block into a first geometric partition and a second geometric partition          901

Construct a uni-directional MV candidate list of the GPM          902

Receive a first merge GPM index for the first geometric partition and a second merge GPM index for the second geometric partition          903

Update the uni-directional MV candidate list based on the first merge GPM index and the second merge GPM index          904

FIG. 9

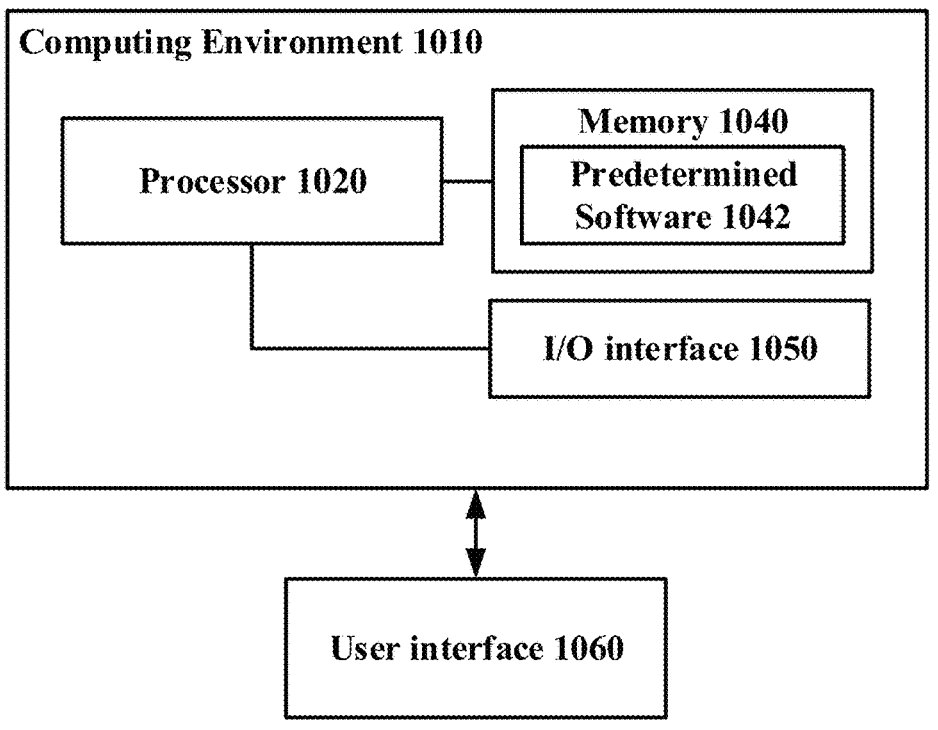

Computing Environment 1010

Processor 1020

Memory 1040
Predetermined Software 1042

I/O interface 1050

User interface 1060

FIG. 10

GEOMETRIC PARTITION MODE WITH MOTION VECTOR REFINEMENT

CROSS-REFERENCE TO RELATED APPLICATION

This application is a continuation application of PCT Application No. PCT/US2022/029704, filed on May 17, 2022, which claims priority to Provisional Application No. 63/189,661 filed on May 17, 2021, the disclosure of which is incorporated herein by reference in its entirety for all purposes.

TECHNICAL FIELD

This disclosure is related to video coding and compression. More specifically, this disclosure relates to methods and apparatus on improving the coding efficiency of geometric partition (GPM) mode, also known as angular weighted prediction (AWP) mode.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

SUMMARY

Examples of the present disclosure provide methods and apparatus, for video coding and a non-transitory computer-readable storage medium.

According to a first aspect of the present disclosure, a method for decoding a video block in GPM is provided. In the method, a decoder may partition the video block into a first geometric partition and a second geometric partition. The decoder may receive a first template matching (TM) enable flag for the first geometric partition and receive a second TM enable flag for the second geometric partition, he first TM enable flag indicating whether a uni-directional motion of the first geometric partition is refined by TM, and the second TM enable flag indicating whether a uni-directional motion of the second geometric partition is refined by the TM. The decoder may receive a first merge GPM index for the first geometric partition and a second merge GPM index for the second geometric partition. The decoder may construct a uni-directional motion victor (MV) candidate list of the GPM. The decoder may generate a first uni-directional MV for the first geometric partition and a second uni-directional MV for the second geometric partition.

According to a second aspect of the present disclosure, a method for decoding a video block in GPM is provided. In the method, a decoder may partition the video block into a first geometric partition and a second geometric partition. The decoder may construct a uni-directional MV candidate list of the GPM. The decoder may receive a first merge GPM index for the first geometric partition and a second merge GPM index for the second geometric partition. The decoder may update the uni-directional MV candidate list based on the first merge GPM index and the second merge GPM index, the first merge GPM index and the second merge GPM index indicating whether one uni-directional MV is refined by a TM.

According to a third aspect of the present disclosure, an apparatus for video decoding is provided. The apparatus may include one or more processors and a non-transitory computer-readable storage medium. The non-transitory computer-readable storage medium is configured to store instructions executable by the one or more processors. The one or more processors, upon execution of the instructions, are configured to perform the method in the first or second aspect.

According to a fourth aspect of the present disclosure, a non-transitory computer-readable storage medium is provided. The non-transitory computer-readable storage medium may store computer-executable instructions that, when executed by one or more computer processors, cause the one or more computer processors to perform the method in the first or second aspect.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5 is a table illustrating a uni-prediction motion vector selection according to an example of the present disclosure.

FIG. 6A is an illustration of a motion vector differences (MMVD) mode according to an example of the present disclosure.

FIG. 6B is an illustration of an MMVD mode according to an example of the present disclosure.

FIG. 7 is an illustration of a template matching (TM) algorithm according to an example of the present disclosure.

FIG. 8 is a method of decoding a video block in GPM according to an example of the present disclosure.

FIG. 9 is a method of decoding a video block in GPM according to an example of the present disclosure.

FIG. 10 is a diagram illustrating a computing environment coupled with a user interface according to an example of the present disclosure.

DETAILED DESCRIPTION

Figure 1:
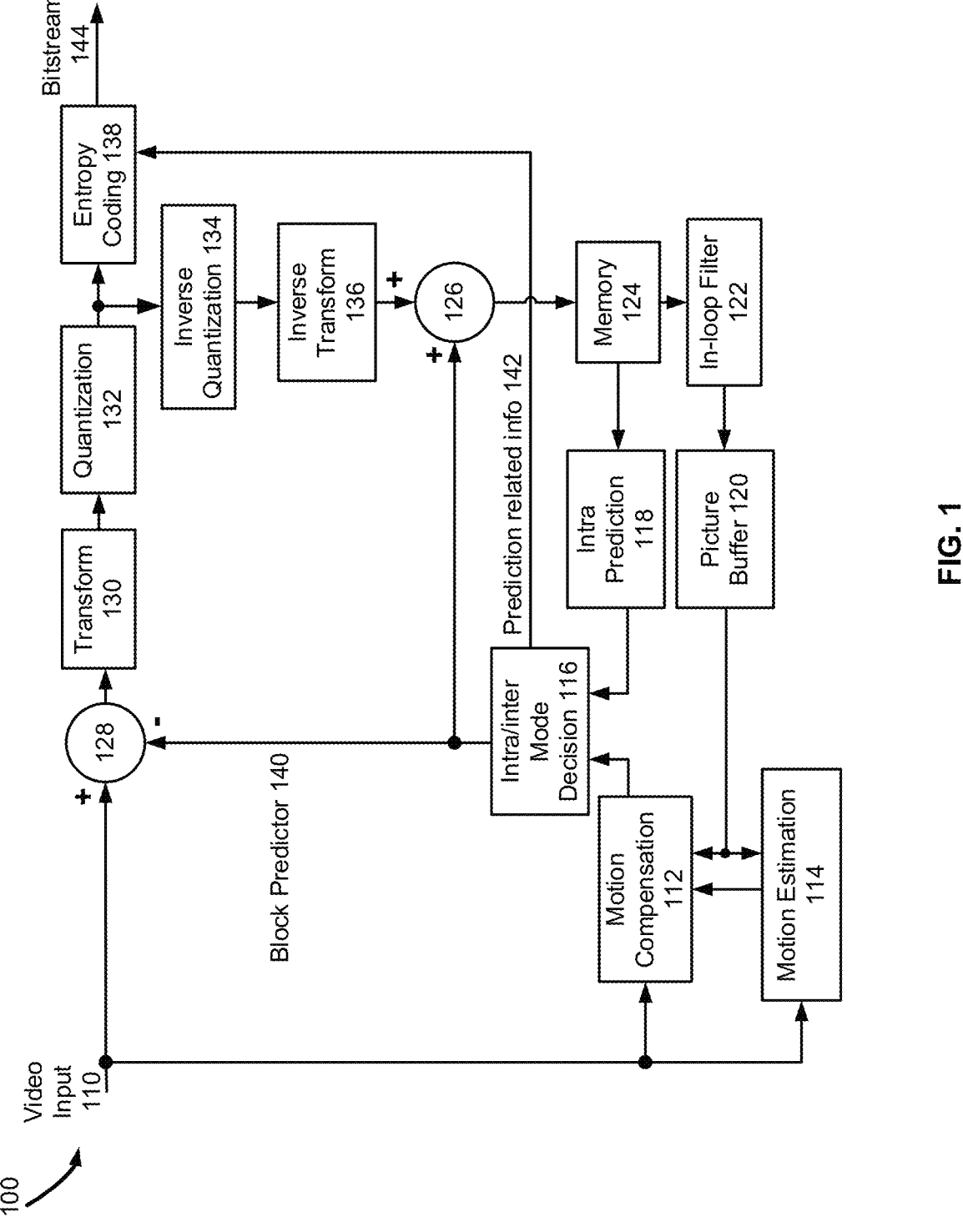
FIG. 1 is a block diagram of an encoder according to an example of the present disclosure.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

Like the HEVC, the AVS3 standard is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture store the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture store of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3; instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

As shown in FIGS. 3A, 3B, 3C, 3D, and 3E, there are five splitting types, quaternary partitioning, horizontal binary partitioning, vertical binary partitioning, horizontal extended quad-tree partitioning, and vertical extended quad-tree partitioning.

Figures 3A, 3B, 3C, 3D, 3E:
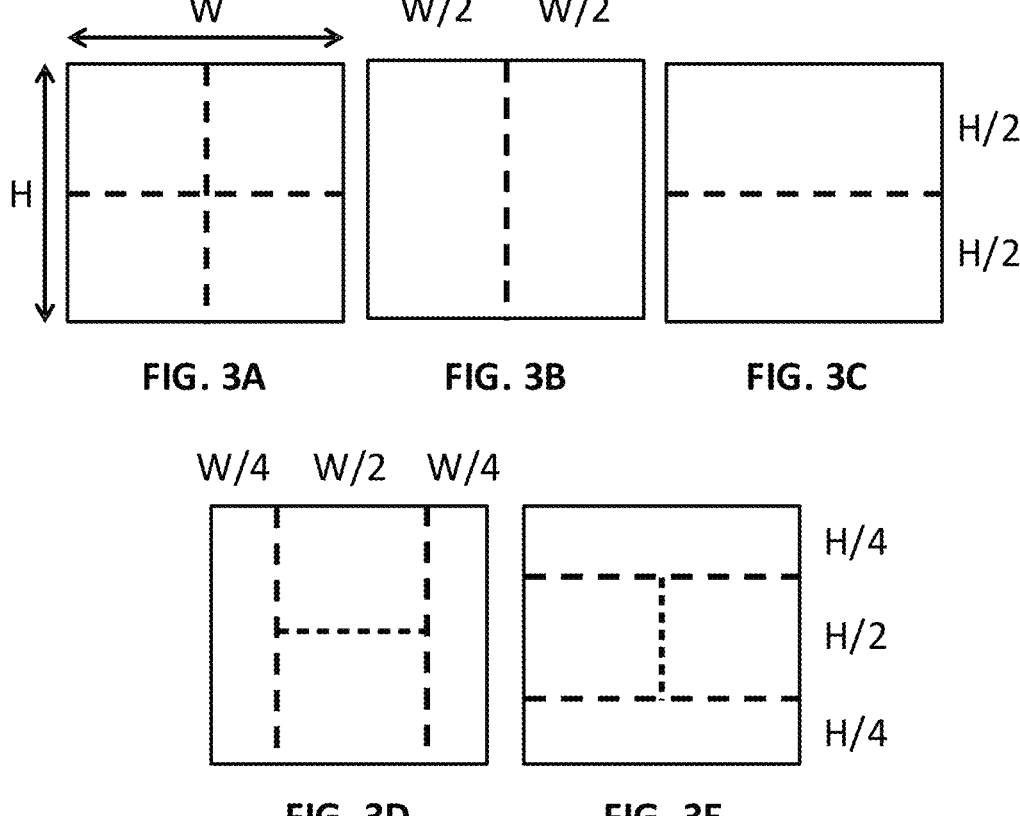
FIG. 3A is a diagram illustrating block partitions in a multi-type tree structure according to an example of the present disclosure.
FIG. 3B is a diagram illustrating block partitions in a multi-type tree structure according to an example of the present disclosure.
FIG. 3C is a diagram illustrating block partitions in a multi-type tree structure according to an example of the present disclosure.
FIG. 3D is a diagram illustrating block partitions in a multi-type tree structure according to an example of the present disclosure.
FIG. 3E is a diagram illustrating block partitions in a multi-type tree structure according to an example of the present disclosure.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes from. After spatial and/or temporal prediction, the mode decision block in the encoder chooses the best prediction mode, for example based on the rate-distortion optimization method. The prediction block is then subtracted from the current video block; and the prediction residual is de-correlated using transform and then quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used as reference to code future video blocks. To form the output video bitstream, coding mode (inter or intra), prediction mode information, motion information, and quantized residual coefficients are all sent to the entropy coding unit to be further compressed and packed.

Figure 2:
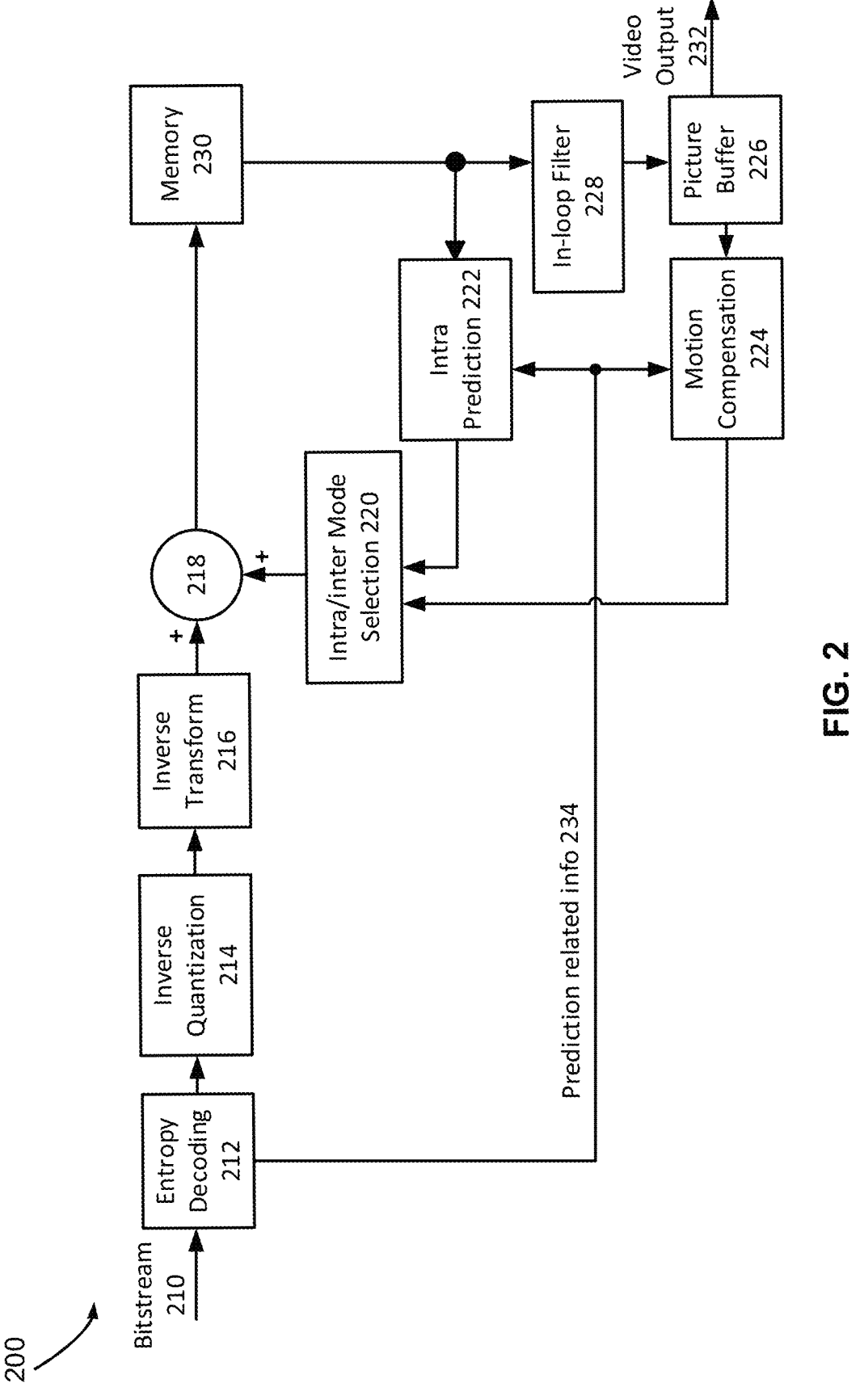
FIG. 2 is a block diagram of a decoder according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is first entropy decoded at entropy decoding unit. The coding mode and prediction information are sent to either the spatial prediction unit (if intra coded) or the temporal prediction unit (if inter-coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out for display, as well as used to predict future video blocks.

The focus of the disclosure is to improve the coding performance of the geometric partition mode (GPM) that are used in both the VVC and the AVS3 standards. In the AVS3, the tool is also known as angular weighted prediction (AWP) which follows the same design spirit of GPM but with some subtle differences in certain design details. To facilitate the description of the disclosure, in the following, the existing GPM design in the VVC standard is used as an example to explain the main aspects of the GPM/AWP tool. Meanwhile, another existing inter-prediction technology called merge mode with motion vector differences (MMVD) that are applied in both VVC and AVS3 standards are also briefly reviewed, given that it is closely related with the proposed technologies in this disclosure. After that, some drawbacks of the current GPM/AWP design are identified. Finally, the proposed methods are provided in details. Please note that though the existing GPM design in the VVC standard is used as the example throughout the disclosure, to a person skilled in the art of modern video coding technologies, the proposed technologies can also be applied to other GPM/AWP designs or other coding tools with the same or similar design spirit.

Geometric Partition Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

Figure 4:
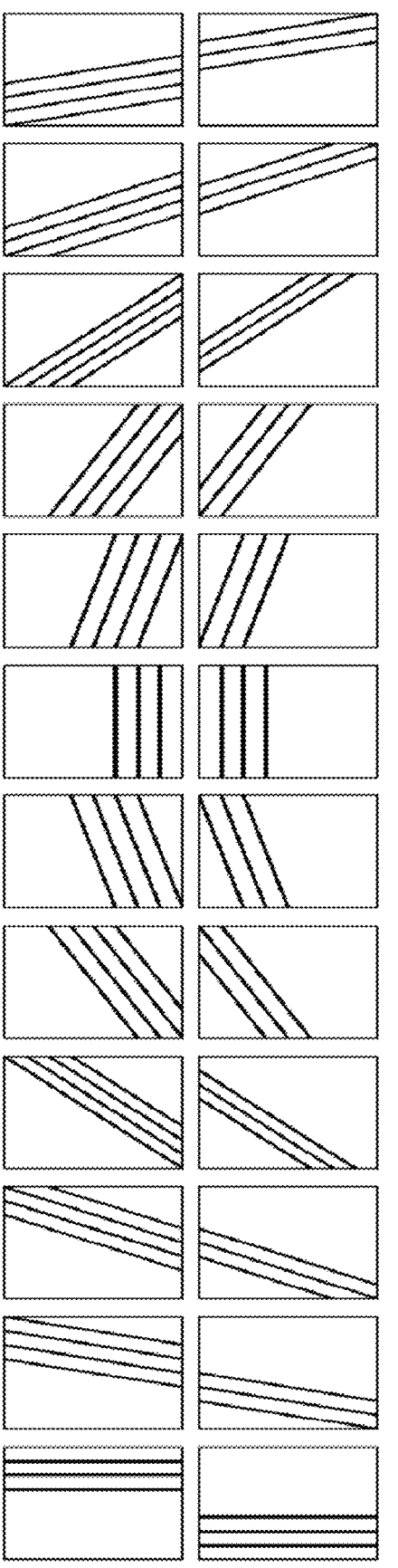
FIG. 4 is an illustration of allowed geometric partition (GPM) partitions according to an example of the present disclosure.

When this mode is used, a CU is split into two parts by a geometrically located straight line, as shown in FIG. 4 (description provided below). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

FIG. 4 shows allowed GPM partitions, where the splits in each picture have one identical split direction.

Uni-Prediction Candidate List Construction

To derive the uni-prediction motion vector for one geometric partition, one uni-prediction candidate list is firstly derived directly from the regular merge candidate list generation process. Denote n as the index of the uni-prediction motion in the geometric uni-prediction candidate list. The LX motion vector of the n-th merge candidate, with X equal to the parity of n, is used as the n-th uni-prediction motion vector for geometric partitioning mode.

These motion vectors are marked with "x" in FIG. 5 (described below). In case a corresponding LX motion vector of the n-the extended merge candidate does not exist, the L(1−X) motion vector of the same candidate is used instead as the uni-prediction motion vector for geometric partitioning mode.

FIG. 5 shows a uni-prediction motion vector selection from the motion vectors of merge candidate list for the GPM.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction, and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 4). After that, two syntax elements merge_gpm_idx0 and merge_gpm_idx1 are signaled to indicate the indices of the uni-prediction merge candidates that are used for the first GPM partition and the second GPM partition. More specifically, those two syntax elements are used to determine the uni-directional MVs of the two GPM partitions from the uni-prediction merge list as described in the section "uni-prediction merge list construction." According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bitstream. At decoder side, the first uni-prediction merge index is firstly decoder. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

| The existing GPM syntax elements in merge data syntax table of the VVC specification | |
|---|---|
| | Descriptor |
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |

TABLE 1-continued

| The existing GPM syntax elements in merge data syntax table of the VVC specification | |
| --- | --- |
| | Descriptor |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| ...... | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand-1 and MaxGPMMergeCand-2 for merge_gpm_idx0 and merge_gpm_idx1, respectively. MaxGPMMergeCand is the number of the candidates in the uni-prediction merge list.

When the GPM/AWP mode is applied, two different binarization methods are applied to translate the syntax merge_gpm_partition_idx into a string of binary bits. Specifically, the syntax element is binarized by fixed-length code and truncated binary code in the VVC and AVS3 standards, respectively. Meanwhile, for the AWP mode in the AVS3, different maximum values are used for the binarizations of the value of the syntax element. Specifically, in the AVS3, the number of the allowed GPM/AWP partition modes is 56 (i.e., the maximum value of merge_gpm_partition_idx is 55) while the number is increased to 64 (i.e., maximum value of merge_gpm_partition_idx is 63) in the VVC.

Merge Mode with Motion Vector Differences (MMVD)

In addition to conventional merge mode which derives the motion information of one current block from its spatial/temporal neighbors, the MMVD/UMVE mode is introduced in both the VVC and AVS standards as one special merge mode. Specifically, in both the VVC and AVS3, the mode is signaled by one MMVD flag at coding block level. In the MMVD mode, the first two candidates in the merge list for regular merge mode are selected as the two base merge candidates for MMVD. After one base merge candidate is selected and signaled, additional syntax elements are signaled to indicate the motion vector differences (MVDs) that are added to the motion of the selected merge candidate. The MMVD syntax elements include a merge candidate flag to select the base merge candidate, a distance index to specify the MVD magnitude and a direction index to indicate the MVD direction.

In the existing MMVD design, the distance index specifies MVD magnitude, which is defined based on one set of predefined offsets from the starting point. As shown in FIGS. 6A and 6B, the offset is added to either horizontal or vertical component of the starting MV (i.e., the MVs of the selected base merge candidate).

FIG. 6A shows an MMVD mode for the L0 reference. FIG. 6B shows an MMVD mode for the L1 reference.

Table 2 illustrates the MVD offsets that are applied in the AVS3, respectively.

TABLE 2

| The MVD offset used in the AVS3 | | | | | |
| --- | --- | --- | --- | --- | --- |
| Distance IDX | 0 | 1 | 2 | 3 | 4 |
| Offset (in unit of luma sample) | ¼ | ½ | 1 | 2 | 4 |

As shown in Table 3, the direction index is used to specify the signs of the signaled MVD. It is noted that the meaning of the MVD sign could be variant according to the starting MVs. When the starting MVs is a uni-prediction MV or bi-prediction MVs with MVs pointing to two reference pictures whose POCs are both larger than the POC of the current picture, or both smaller than the POC of the current picture, the signaled sign is the sign of the MVD added to the starting MV. When the starting MVs are bi-prediction MVs pointing to two reference pictures with one picture's POC larger than the current picture and the other picture's POC smaller than the current picture, the signaled sign is applied to the L0 MVD and the opposite value of the signaled sign is applied to the L1 MVD.

TABLE 3

| The MVD sign as specified by the direction index | | | | |
| --- | --- | --- | --- | --- |
| Direction IDX | 00 | 01 | 10 | 11 |
| x-axis | + | − | N/A | N/A |
| y-axis | N/A | N/A | + | − |

Motion Signaling for Regular Inter Mode

Similar to the HEVC standard, besides merge/skip modes, both VVC and AVS3 allows one inter CU to explicitly specify its motion information in bitstream. In overall, the motion information signaling in both VVC and AVS3 are kept the same as that in the HEVC standard. Specifically, one inter prediction syntax, i.e., inter_pred_idc, is firstly signaled to indicate whether the prediction signal from list L0, L1 or both. For each used reference list, the corresponding reference picture is identified by signaling one reference picture index ref_idx_lx (x=0, 1) for the corresponding reference list, and the corresponding MV is represented by one MVP index mvp_lx_flag (x=0, 1) which is used to select the MV predictor (MVP), followed by its motion vector difference (MVD) between the target MV and the selected MVP. Additionally, in the VVC standard, one control flag mvd_l1_zero_flag is signaled at slice level. When the mvd_l1_zero_flag is equal to 0, the L1 MVD is signaled in bitstream; otherwise (when the mvd_l1_zero_flag flag is equal to 1), the L1 MVD is not signaled and its value is always inferred to zero at encoder and decoder.

Bi-Prediction with CU-Level Weight

In the previous standards before VVC and AVS3, when the weighted prediction (WP) is not applied, the bi-prediction signal is generated by averaging the uni-prediction signals obtained from two reference pictures. In the VVC, one tool coding, namely bi-prediction with CU-level weight (BCW), was introduced to improve the efficiency of bi-prediction. Specifically, instead of simple averaging, the bi-prediction in the BCW is extended by allowing weighted averaging of two prediction signals, as depicted as:

$$P'(i,j)=((8-w)\cdot P_0(i,j)+w\cdot P_1(i,j)+4)>>3$$

11

In the VVC, when the current picture is one low-delay picture, the weight of one BCW coding block is allowed to be selected from a set of predefined weight values $w \in \{-2, 3, 4, 5, 10\}$ and weight of 4 represents traditional bi-prediction case where the two uni-prediction signals are equally weighted. For low-delay, only 3 weights $w \in \{3, 4, 5\}$ are allowed. Generally speaking, though there are some design similarities between the WP and the BCW, the two coding tools are targeting at solving the illumination change problem at different granularities. However, because the interaction between the WP and the BCW could potentially complicate the VVC design, the two tools are disallowed to be enabled simultaneously. Specifically, when the WP is enabled for one slice, then the BCW weights for all the bi-prediction CUs in the slice are not signaled and inferred to be 4 (i.e., the equal weight being applied).

Template Matching

Template matching (TM) is a decoder side MV derivation method to refine the motion information of the current CU by finding the best match between one template which consists of top and left neighboring reconstructed samples of the current CU and a refence block (i.e., same size to the template) in a reference picture. As illustrated in FIG. 7, one MV is to be searched around the initial motion vector of the current CU within a [−8, +8]-pel search range. Best match may be defined as the MV that achieves the lowest matching cost, for example, sum of absolute difference (SAD), sum of absolute transformed difference (SATD) and so forth, between the current template and the reference template. There are two different ways to apply the TM mode for inter coding:

In AMVP mode, an MVP candidate is determined based on template matching difference to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in the below Table 13. This search process ensures that the MVP candidate still keeps the same MV precision as indicated by AMVR mode after TM process.

TABLE 13

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| ⅛-pel cross | | | | | v | |

12

In merge mode, similar search method is applied to the merge candidate indicated by the merge index. As shown in the above table, TM may perform all the way down to ⅛-pel MVD precision or skip those beyond half-pel MVD precision, depending on whether the alternative interpolation filter (that is used when AMVR is of half-pel mode) is used according to merged motion information.

As mentioned above, the uni-directional motion that is used to generate the prediction samples of two GPM partitions are directly obtained from the regular merge candidates. In case there are not strong correlation between the MVs of spatial/temporal neighboring blocks, the derived uni-directional MV from merge candidates may not be accurate enough to capture the true motion of each GPM partition. Motion estimation is capable of offering more accurate motion which however comes at a cost of non-negligible signaling overhead due to arbitrary motion refinements that can be applied on top of the existing uni-directional MVs. On the other hand, the MVMD mode is utilized in both the VVC and AVS3 standards, which has been proven to be one efficient signaling mechanism to reduce the MVD signaling overhead. Therefore, it could be also beneficial to combine the GPM with the MMVD mode. Such combination can potentially improve the overall coding efficiency of the GPM tool by providing more accurate MVs to capture the individual motion of each GPM partition.

As discussed earlier, in both VVC and AVS3 standards, the GPM mode is only applied to merge/skip modes. Such design may not be optimal in terms of the coding efficiency given that all the non-merge inter CUs cannot benefit from the flexible non-rectangular partitions of the GPM. On the other hand, because of the same reason as above mentioned, the uni-prediction motion candidates derived from regular merge/skip modes are not always precise to capture the true motion of two geometric partitions. Based on such analyses, extra coding gain can be expected by reasonable extension of the GPM mode to non-merge inter modes (i.e., the CUs that explicitly signal their motion information in bitstream). However, improvements on MV accuracy comes at the cost of increased signaling overhead. Therefore, to efficiently apply the GPM mode to explicit inter modes, it would be important to identify one effective signaling scheme which can minimize the signaling cost while providing more accurate MVs for two geometric partitions.

Proposed Methods

In this disclosure, methods are proposed to further improve the coding efficiency of the GPM by applying further motion refinements on top of the existing uni-directional MVs that are applied to each GPM partition. The proposed methods are named as geometric partition mode with motion vector refinement (GPM-MVR). Additionally, in the proposed schemes, motion refinements are signaled in one similar manner of the existing MMVD design, i.e., based on a set of predefined MVD magnitudes and directions of the motion refinements.

In another aspect of the disclosure, solutions are provided to extend the GPM mode to explicit inter modes. To facilitate descriptions, those schemes are named as geometric partition mode with explicit motion signaling (GPM-EMS). Specifically, to achieve a better harmonization with regular inter mode, the existing motion signaling mechanism, i.e., MVP plus MVD, are utilized in the proposed GPM-EMS schemes to specify the corresponding uni-directional MVs of two geometric partitions.

Geometric Partition Mode with Separate Motion Vector Refinements

To improve the coding efficiency of the GPM, in this section, one improved geometric partition mode with separate motion vector refinements is proposed. Specifically, given a GPM partition, the proposed method firstly uses the existing syntax merge_gpm_idx0 and merge_gpm_idx1 to identify the uni-directional MVs for two GPM partitions from the existing uni-prediction merge candidate list and use them as the base MVs. After the two base MVs are determined, two set of new syntax elements are introduced to specify the values of motion refinements that are applied on top of the base MVs of the two GPM partitions separately. Specifically, two flags, namely, gpm_mvr_partIdx0_enable_flag and gpm_mvr_partIdx1_enable_flag, are firstly signal to indicate whether the GPM-MVR is applied to the first GPM partition and the second GPM partition, respectively. When the flag of one GPM partition is equal to one, the corresponding value of the MVR that is applied to the base MV of the partition is signaled in the MMVD style, i.e., one distance index (as indicated by the syntax elements gpm_mvr_partIdx0_distance_idx and gpm_mvr_partIdx1_distance_idx) to specify the magnitude of the MVR and one direction index (as indicated by the syntax elements gpm_mvr_partIdx0_direction_idx and gpm_mvr_partIdx1_distance_idx) to specify the direction of the MVR. Table 4 illustrates the syntax elements that are introduced by the proposed GPM-MVR methods.

TABLE 4

The syntax elements of the proposed GPM-MVR method with separate MVRs for two GPM partitions (Method One)

| | De-scriptor |
|---|---|
| merge_data( x0, y0, cbWidth, cbHeight, chType ) { | |
| ...... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| merge_gpm_idx1[ x0 ][ y0 ] | ae(v) |
| gpm_mvr_partIdx0_enable_flag[ x0 ][ y0 ] | ae(v) |
| if( gpm_mvr_partIdx0_enable_flag[ x0 ][ y0 ] ) { | |
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| if( merge_gpm_idx0 != merge_gpm_idx1 ‖ | |
| gpm_mvr_partIdx0_enable_flag ) | |
| gpm_mvr_partIdx1_enable_flag[ x0 ][ y0 ] | ae(v) |
| if( gpm_mvr_partIdx1_enable_flag[ x0 ][ y0 ] ) { | |
| gpm_mvr_partIdx1_direction_idx[ x0 ][ y0 ] | ae(v) |
| gpm_mvr_partIdx1_distance_idx[ x0 ][ y0 ] | ae(v) |
| } | |
| } | |
| ...... | |
| } | |

Based on the proposed syntax elements as shown in Table 4, at decoder, the final MV that is used for generating the uni-prediction samples of each GPM partition is equal to the sum of the signaled motion vector refinement and the corresponding base MV. In practice, different sets of MVR magnitudes and directions may be predefined and applied to the proposed GPM-MVR scheme, which can offer various tradeoffs between the motion vector accuracy and signaling overhead. In one specific example, it is proposed to reuse the eight MVD offsets (i.e., ¼-, ½-, 1, 2, 4, 8-, 16- and 32-pel) and four MVD directions (i.e., +/− x- and y-axis) used in the VVC standard for the proposed GPM-MVR scheme. In another example, the existing five MVD offsets {¼-, ½-, 1, 2- and 4-pel} and four MVD directions (i.e., +/− x- and y-axis) used in the AVS3 standard are applied in the proposed GPM-MVR scheme.

As discussed in the section "GPM signaling design," because the uni-directional MVs used for two GPM partitions cannot be identical, one constraint is applied in the existing GPM design that enforces the two uni-prediction merge indices to be different. However, in the proposed GPM-MVR scheme, further motion refinements are applied on top of the existing GPM uni-directional MVs. Therefore, even when the base MVs of two GPM partitions are identical, the final uni-directional MVs used for predicting two partitions could still be different as long as the values of two motion vector refinements are not the same. Based on the above consideration, the constraint (which restricts two uni-prediction merge indices to be different) is removed when the proposed GPM-MVR scheme is applied. Additionally, because the two uni-prediction merge indices are allowed to be identical, the same maximum value MaxGPMMergeCand−1 is used for the binarization of both merg_gpm_idx0 and merge_gpm_idx1, where MaxGPM-MergeCand is the number of the candidates in the uni-prediction merge list.

As analyzed above, when the uni-prediction merge indices (i.e., merge_gpm_idx0 and mer ge_gpm_idx1) of two GPM partitions are identical, the values of the two motion vector refinements cannot be the same to ensure the final MVs used for the two partitions are different. Based on such condition, in one embodiment of the disclosure, one signaling redundancy removal method is proposed to use the MVR of the first GPM partition to reduce the signaling overhead of the MVR of the second GPM partition, when the uni-prediction merge indices of two GPM partitions are the same (i.e., merge_gpm_idx0 is equal to merge_gpm_idx1). In one example, the following signaling conditions are applied:

First, when the flag gpm_mvr_partIdx0_enable_flag is equal to 0 (i.e., the GPM-MVR is not applied to the first GPM partition), the flag of gpm_mvr_partIdx1_enable_flag is not signaled but inferred to be 1 (i.e., GPM-MVR is applied to the second GPM partition).

Second, when both flags gpm_mvr_partIdx0_enable_flag and gpm_mvr_partIdx1_enable_flag are equal to 1 (i.e., GPM-MVR are applied to two GPM partitions) and gpm_mvr_partIdx0_direction_idx is equal to gpm_mvr_partIdx1_direction_idx (i.e., the MVRs of two GPM partitions have the same direction), the magnitude of the MVR of the first GPM partition (i.e., gpm_mvr_partIdx0_direction_idx) is used to predict the magnitude of the MVR of the second GPM partition (i.e., gpm_mvr_partIdx1_distance_idx). Specifically, if gpm_mvr_partIdx1_distance_idx is smaller than gpm_mvr_partIdx0_distance_idx, its original value is directly signaled. Otherwise (gpm_mvr_partIdx1_distance_idx is larger than gpm_mvr_partIdx0_distance_idx), its value is subtracted by one before being signaled to bitstream. At decoder side, for decoding the value of gpm_mvr_partIdx1_distance_idx, if the parsed value is smaller than gpm_mvr_partIdx0_distance_idx, gpm_mvr_partIdx1_distance_idx is set equal to the parse value; otherwise (the parsed value is equal to or larger than gpm_mvr_partIdx0_distance_idx),
gpm_mvr_partIdx1_distance_idx is set equal to the parsed value plus one. In such case, to further reduce the overhead, different maximum values MaxGPMMVRDistance–1 and MaxGPMMVRDistance–2 can be used for the binarizations of gpm_mvr_partIdx0_distance_idx and gpm_mvr_partIdx1_distance_idx, where MaxGPMMVRDistance is number of allowed magnitudes for the motion vector refinements.

In another embodiment, it is proposed to switch the signaling order to gpm_mvr_partIdx0_direction_idx/gpm_mvr_partIdx1_direction_idx and gpm_mvr_partIdx0_distance_idx/gpm_mvr_partIdx1_direction_idx such that the MVR magnitudes are signaled in front of the MVR magnitudes. By this way, following the same logics as described above, the encoder/decoder may use the MVR direction of the first GPM partition to condition the signaling of the MVR direction of the second GPM partition. In another embodiment, it is proposed to signaling the MVR magnitude and direction of the second GPM partition first and use them to condition the signaling of the MVR magnitude and direction of the second GPM partition.

In another embodiment, it is proposed to signal the GPM-MVR related syntax elements before the signaling of the existing GPM syntax elements. Specifically, in such design, the two flags gpm_mvr_partIdx0_enable_flag and gpm_mvr_partIdx1_enable_flag are firstly signal to indicate whether the GPM-MVR is applied to the first GPM partition and the second GPM partition, respectively. When the flag of one GPM partition is equal to one, the distance index (as indicated by the syntax elements gpm_mvr_partIdx0_distance_idx and gpm_mvr_partIdx1_distance_idx) and the direction index (as indicated by the syntax elements gpm_mvr_partIdx0_distance_idx and gpm_mvr_partIdx0_distance_idx) to specify the direction of the MVR. After that, the existing syntax merge_gpm_idx0 and merge_gpm_idx1 are signaled to identify the uni-directional MVs for two GPM partitions, i.e., based MVs. Table 5 illustrates the proposed GPM-MVR signaling scheme.

TABLE 5

| The syntax elements of the proposed GPM-MVR method with separate MVRs for two GPM partitions (Method Two) | |
| --- | --- |
| | Descriptor |
| merge_data( x0, y0, cbWidth, cbHeight, chType ) { | |
| ...... | |
| if( !ciip_flag[ x0 ][ y0 ] ) { | |
| merge_gpm_partition_idx[ x0 ][ y0 ] | ae(v) |
| gpm_mvr_partIdx0_enable_flag[ x0 ][ y0 ] | ae(v) |
| if( gpm_mvr_partIdx0_enable_flag[ x0 ][ y0 ] ) { | |
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| gpm_mvr_partIdx1_enable_flag[ x0 ][ y0 ] | ae(v) |
| if( gpm_mvr_partIdx1_enable_flag[ x0 ][ y0 ] ) { | |
| gpm_mvr_partIdx1_direction_idx[ x0 ][ y0 ] | ae(v) |
| gpm_mvr_partIdx1_distance_idx[ x0 ][ y0 ] | ae(v) |
| } | |
| } | |
| merge_gpm_idx0[ x0 ][ y0 ] | ae(v) |
| merge_gpm_idx1[ x0 ][ y0 ] | ae(v) |
| ...... | |
| } | |

Similar to the signaling method in Table 4, certain conditions may be applied when the GPM-MVR signaling method in Table 5 is applied to ensure that the resulting MVs used for the predictions of the two GPM partitions are not identical. Specifically, the following conditions are proposed to constraint the signaling of uni-prediction merge indices merge_gpm_idx0 and merge_gpm_idx1 depending on the values of the MVRs that are applied to the first GPM partition and the second GPM partition:

First, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same;

Second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical.

Third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical.

Fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above four cases, when the values of merge_gpm_idx0 and merge_gpm_idx1 are disallowed to be identical, the index value of one partition can be used as a predictor for the index value of the other partition. In one method, it is proposed to firstly signal merge_gpm_idx0 and use its value to predict merge_gpm_idx1. Specifically, at an encoder, when merge_gpm_idx1 is greater than merge_gpm_idx0, the value of merge_gpm_idx1 that is sent to a decoder is reduced by 1. At the decoder, when the received value of merge_gpm_idx1 is equal to or greater than the received value of merge_gpm_idx0, the value of merge_gpm_idx1 is increased by 1. In another method, it is proposed to firstly signal merge_gpm_idx1 and use its value to predict merge_gpm_idx0. In such case, therefore, at the encoder, when merge_gpm_idx0 is greater than merge_gpm_idx1, the value of merge_gpm_idx0 that is sent to the decoder is reduced by 1. At the decoder, when the received value of merge_gpm_idx0 is equal to or greater than the received value of merge_gpm_idx1, the value of merge_gpm_idx0 is increased by 1. Additionally, similar to the existing GPM signaling design, different maximum values MaxGPMMergeCand–1 and MaxGPMMerge-Cand–2 can be used for the binarization of the first and second index values according to the signaling order, respectively. On the other hand, when the values of merge_gpm_idx0 and merge_gpm_idx1 are allowed to be identical because there is no correlation between the two index values, the same maximum value MaxGPMMerge-Cand−1 is used for the binarization of both two index values.

In the above method, in order to reduce the signaling cost, different maximum values may be applied for the binarization of the merge_gpm_idx0 and merge_gpm_idx1. The selection of the corresponding maximum value is dependent on the decoded values of the MVRs (as indicated by gpm_mvr_partIdx0_enable, gpm_mvr_partIdx1_enable, gpm_mvr_partIdx0_direction_idx, gpm_mvr_partIdx1_direction_idx, gpm_mvr_partIdx0_distance_idx and gpm_mvr_partIdx1_distance_idx). Such design introduces undesirable parsing dependency between different GPM syntax elements, which might affect the overall parsing throughout. In order to solve such issue, in one embodiment, it is proposed to always one same maximum value (e.g., MaxGPMMergeCand−1) for parsing the values of merge_gpm_idx0 and merge_gpm_idx1. When such method is used, one bitstream conformance constraint may be used to prevent the two decoded MVs of two GPM partitions to be the same. In another method, is can also remove such non-identity constraint such that the decoded MVs of two GPM partitions are allowed to be the same. On the other hand, when such method is applied (i.e., using the same maximum values for merge_gpm_idx0 and merge_gpm_idx1), there is no parsing dependency between merge_gpm_idx0/merge_gpm_idx1 and other GPM-MVR syntax elements. Therefore, the order of signaling those syntax elements does not matter anymore. In one example, it is proposed to move the signaling of merge_gpm_idx0/ merge_gpm_idx1 in front of the signaling of gpm_mvr_partIdx0_enable, gpm_mvr_partIdx1_enable, gpm_mvr_partIdx0_direction_idx, gpm_mvr_partIdx1_direction_idx, gpm_mvr_partIdx0_distance_idx and gpm_mvr_partIdx1_distance_idx.

Geometric Partition Mode with Symmetric Motion Vector Refinement

For the GPM-MVR methods discussed above, two separate MVR values are signaled with one being applied to improve the base MV of only one GPM partition. Such method can be efficient with regards to the improvement of prediction accuracy by allowing independent motion refinement for each GPM partition. However, such flexible motion refinement comes at a cost of increasing signaling overhead given that two different set of GMP-MVR syntax elements need to be sent from encoder to decoder. To reduce the signaling overhead, in this section, one geometric partition mode with symmetric motion vector refinement is proposed. Specifically, in this method, one single MVR value is signaled for one GPM CU and is used for both two GPM partitions according to the symmetry relationship between the picture order count (POC) values of the current picture and the reference pictures associated with two GPM partitions. Table 6 illustrates the syntax elements when the proposed method is applied.

18

TABLE 6

The syntax elements of the proposed GPM-MVR method with symmetric MVRs for two GPM partitions (Method One)

| | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     merge_gpm_idx0[ x0 ][ y0 ] | ae(v) |
|     merge_gpm_idx1[ x0 ][ y0 ] | ae(v) |
|     gpm_mvr_enable_flag[ x0 ][ y0 ] | ae(v) |
|     if( gpm_mvr_enable_flag[ x0 ][ y0 ] ) { | |
|       gpm_mvr_direction_idx[ x0 ][ y0 ] | ae(v) |
|       gpm_mvr_distance_idx[ x0 ][ y0 ] | ae(v) |
|     } | |
| ...... | |
| } | |

As shown in Table 6, after the base MVs of two GPM partitions are selected (based on merge_gpm_idx0 and merge_gpm_idx_1), one flag gpm_mvr_enable_flag is signaled to indicate whether the GPM-MVR mode is applied to the current GPM CU or not. When the flag is equal to one, it indicates the motion refinement is applied to enhance the base MVs of two GPM partitions. Otherwise (when the flag is equal to zero), it indicates that the motion refinement is applied to neither of two partitions. If the GPM-MVR mode is enabled, additional syntax elements are further signaled to specify the values of the applied MVR by a direction index gpm_mvr_direction_idx and a magnitude index gpm_mvr_direction_idx. Additionally, similar to the MMVD mode, the meaning of MVR sign could be variant according to the relationship among the POCs of the current picture and two reference pictures of GPM partitions. Specifically, when both the POCs of two reference pictures are larger than or smaller than the POC of the current picture, the signaled sign is the sign of the MVR that is added to both two base MVs. Otherwise (when the POC of one reference picture is larger than the current picture while the POC of the other reference picture is smaller than the current picture), the signaled sign is applied to the MVR of the first GPM partition and the opposite sign is applied to the second GPM partition. In Table 6, the values of merge_gpm_idx0 and merge_gpm_idx_1 are allowed to be identical.

In another embodiment, it is proposed to signal two different flags to separately control the enabling/disabling of the GPM-MVR mode for two GPM partitions separately. However, when the GPM-MVR mode is enabled, only one MVR is signaled based on the syntax elements gpm_mvr_direction_idx and gpm_mvr_direction_idx. The corresponding syntax table of such signaling method is illustrated in Table 7.

TABLE 7

The syntax elements of the proposed GPM-MVR method with symmetric MVRs for two GPM partitions (Method Two)

| | Descriptor |
|---|---|
| merge_data( x0, y0, cbWidth, cbHeight, chType ) { | |
| ...... | |
|   if( !ciip_flag[ x0 ][ y0 ] ) { | |
|     merge_gpm_partition_idx[ x0 ][ y0 ] | ae(v) |
|     merge_gpm_idx0[ x0 ][ y0 ] | ae(v) |
|     merge_gpm_idx1[ x0 ][ y0 ] | ae(v) |
|     gpm_mvr_partIdx0_enable_flag[ x0 ][ y0 ] | ae(v) |
|     if( merge_gpm_idx0 != merge_gpm_idx1 \|\| | |

TABLE 7-continued

The syntax elements of the proposed GPM-MVR method with
symmetric MVRs for two GPM partitions (Method Two)

| | De-scriptor |
|---|---|
| gpm_mvr_partIdx0_enable_flag ) | |
|     gpm_mvr_partIdx1_enable_flag[ x0 ][ y0 ] | ae(v) |
|     if( gpm_mvr_partIdx0_enable_flag[ x0 ][ y0 ] \|\| | |
| gpm_mvr_partIdx1 | |
|     _enable_flag[ x0 ][ y0 ] ) { | |
|     gpm_mvr_direction_idx[ x0 ][ y0 ] | ae(v) |
|     gpm_mvr_distance_idx[ x0 ][ y0 ] | ae(v) |
|     } | |
|   ...... | |
| } | |

When the signaling method in Table 7 is applied, the values of merge_gpm_idx0 and merge_gpm_idx1 are allowed to be identical. However, to ensure that the resulting MVs applied to two GPM partitions are not redundant, when the flag gpm_mvr_partIdx0_enable_flag is equal to 0 (i.e., the GPM-MVR is not applied to the first GPM partition), the flag gpm_mvr_partIdx1_enable_flag is not signaled but inferred to be 1 (i.e., GPM-MVR is applied to the second GPM partition).

Adaptation of the Allowed MVRs for the GPM-MVR

In the GPM-MVR methods discussed above, one fixed group of MVR values are used for the GPM CUs at both encoder and decoder in one video sequence. Such design is suboptimal for video contents with high resolutions or with fierce motion. In those cases, the MVs tend to be much large such that fixed MVR values may not be optimal to capture the real motion of those blocks. To further improve the coding performance of the GPM-MVR mode, it is proposed in this disclosure to support the adaptation of the MVR values that are allowed to be selected by the GPM-MVR mode at various coding level, such as sequence level, picture/slice picture, coding block group level and so forth. For example, multiple MVR sets as well as the corresponding code-words may be derived off-line according to the specific motion characteristics of different video sequences. The encoder may select the best MVR set and signal the corresponding index of the selected set to decoder.

Encoder Speed-Up Logics for GPM-MVR Rate-Distortion Optimization

For the proposed GPM-MVR schemes, to determine the optimal MVR for each GPM partition, encoder may need to test the rate-distortion cost of each GPM partition multiple times, each with varying the MVR values that are being applied. This could significantly increase the encoding complexity of the GPM mode. In order to address the encoding complexity issue, the following fast encoding logics are proposed in this section:

First, due to the quad-/binary-/ternary-tree block partition structure that is applied in the VVC and AVS3, one same coding block can be checked during the rate-distortion optimization (RDO) process, each divided through one different partition path. In the current VTM/HPM encoder implementations, the GPM and GPM-MVR modes along with other inter and intra coding modes are always tested whenever one same CU is obtained through different block partition combinations. Generally speaking, for different partition paths, only the neighboring blocks of one CU could be different, which, however, should have a relatively minor impact on the optimal coding mode that one CU will select. Based on such consideration, to reduce the total number of GPM RDO being applied, it is proposed to store the decision whether the GPM mode is selected when the RD cost of one CU is checked for the first time. After that, when the same CU is checked by the RDO process again (by another partition path), the RD cost of the GPM (including GPM-MVR) is checked only if the GPM is selected for the CU at the first time. In case when the GPM is not selected for the initial RD checking of one CU, only the GPM (without GPM-MVR) is tested when the same CU is achieved through another partition path. In another method, when the GPM is not selected for the initial RD checking of one CU, both the GPM and GPM-MVR are not tested when the same CU is achieved through another partition path.

Second, to reduce the number of GPM partitions for the GPM-MVR mode, it is proposed to maintain the first M GPM partition modes without the smallest RD costs when the RD cost of one CU is checked for the first time. After that, when the same CU is checked by the RDO process again (by another partition path), only those M GPM partition modes are tested for the GPM-MVR mode.

Third, to reduce the number of GPM partitions that are tested for the initial RDO process of one, for each GPM partition, it is proposed to firstly calculate the sum absolute difference (SAD) values when using different uni-prediction merge candidates for two GPM partitions. Then, for each GPM partition under one specific partition mode, select the best uni-prediction merge candidate with the smallest SAD values and calculate the corresponding SAD value of the partition mode which is equal to the sum of the SAD values of best uni-prediction merge candidates for two GPM partition. Then, for the following RD process, only the first N partition modes with the best SAD values for the previous step are tested for the GPM-MVR mode.

Geometric Partition with Explicit Motion Signaling

In this section, multiple methods are proposed to extend the GPM mode to the bi-prediction of regular inter mode where the two uni-directional MVs of the GPM mode are explicitly signaled from encoder to decoder.

In the first solution (Solution One), it is proposed to fully reuse the existing motion signaling of bi-prediction to signal the two uni-directional MVs of the GPM mode. Table 8 illustrates the modified syntax table of the proposed scheme where newly added syntax elements are italic bold. As shown in Table 8, in the solution, all the existing syntax elements of signaling L0 and L1 motion information are fully reused to indicate the uni-directional MVs of two GPM partitions respectively. Additionally, it is assumed that the L0 MV is always associated with the first GPM partition and the L1 MV is always associated with the second GPM partition. One the other hand, in Table 8, the inter prediction syntax, i.e., inter_pred_idc, is signaled in front of the GPM flag (i.e., gpm_flag) such that the value of the inter_pred_idc can be used to condition the presence of gpm_flag. Specifically, the flag gpm_flag only need to be signaled when inter_pred_idc is equal to PRED_BI (i.e., bi-prediction) and both inter_affine_flag and sym_mvd_flag are equal to 0 (i.e., the CU is coded by neither affine mode nor SMVD mode). When the flag gpm_flag is not signaled, its value is always inferred to be 0 (i.e., the GPM mode is disabled). When gpm_flag is 1, another syntax element gpm_partition_idx is further signaled to indicate the selected GPM mode (out of total 64 GPM partitions) for the current CU.

TABLE 8

| The modified syntax table for motion signaling of Solution One (Option One) | |
| --- | --- |
| if( sh_slice_type = = B) | |
|   inter_pred_idc[ x0 ][ y0 ] | ae(v) |
| if( sps_affine_enabled_flag && cbWidth >= 16 && cbHeight >= 16 ) { | |
|   inter_affine_flag[ x0 ][ y0 ] | ae(v) |
|   if( sps_6param_affine_enabled_flag && inter_affine_flag [ x0 ][ y0 ] ) | |
|     cu_affine_type_flag[ x0 ][ y0 ] | ae(v) |
| } | |
| if( sps_smvd_enabled_flag && !ph_mvd_l1_zero_flag && | |
|     inter_pred_idc[ x0 ][ y0 ] = = PRED_BI && | |
|     !inter_affine_flag[ x0 ][ y0 ] && RefIdxSymL0 > −1 && RefIdxSymL1 > −1 ) | |
|   sym_mvd_flag[ x0 ][ y0 ] | ae(v) |
| if( inter_pred_idc[ x0 ][ y0 ] != PRED_L1 ) { | |
|   if( NumRefIdxActive[ 0 ] > 1 && !sym_mvd_flag[ x0 ][ y0 ] ) | |
|     ref_idx_l0[ x0 ][ y0 ] | ae(v) |
|   mvd_coding( x0, y0, 0, 0 ) | |
|   if( MotionModelIdc[ x0 ][ y0 ] > 0 ) | |
|     mvd_coding( x0, y0, 0, 1 ) | |
|   if(MotionModelIdc[ x0 ][ y0 ] > 1 ) | |
|     mvd_coding( x0, y0, 0, 2 ) | |
|   mvp_l0_flag[ x0 ][ y0 ] | ae(v) |
| } else { | |
|   MvdL0[ x0 ][ y0 ][ 0 ] = 0 | |
|   MvdL0[ x0 ][ y0 ][ 1 ] = 0 | |
| } | |
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( ph_mvd_l1_zero_flag && inter_pred_idc[ x0 ][ y0 ] = = PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding( x0, y0, 1, 0 ) | |
|     if( MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding( x0, y0, 1, 2 ) | |
|   } | |
|   mvp_l1_flag[ x0 ][ y0 ] | ae(v) |
| } else { | |
|   MvdL1[ x0 ][ y0 ][ 0 ] = 0 | |
|   MvdL1[ x0 ][ y0 ][ 1 ] = 0 | |
| } | |
| if( inter_pred_idc[ x0 ][ y0 ] = = PRED_BI & & !inter_affine_flag [ x0 ][ y0 ] && !sym_mvd_flag[ x0 ][ y0 ] && cbWidth >= 8 && | |
|     cbHeight >= 8 && cbWidth < ( 8 * cbHeight ) && | |
|     cbHeight < ( 8 * cbWidth ) && cbWidth < 128 && | |
|     cbHeight < 128 ) { | |
|   gpm_flag[ x0 ][ y0 ] | ae(v) |
|   if( gpm_partition_flag[ x0 ][ y0 ] ) { | |
|     gpm_partition_idx[ x0 ][ y0 ] | ae(v) |
|   } | |

In another method, it is proposed to place the signaling of the flag gpm_flag in front of the other inter signaling syntax elements such that the value of gpm_flag can be used to determine whether the other inter syntax elements need to be present or not. Table 9 illustrates the corresponding syntax table when such method is applied where newly added syntax elements are italic bold. As it can be seen, the gpm_flag is firstly signaled in Table 9. When the gpm_flag is equal to 1, the corresponding signaling of inter_pred_idc, inter_affine_flag and sym_mvd_flag can be bypassed. Instead, the corresponding values of three syntax elements can be inferred as PRED_BI, 0 and 0, respectively.

TABLE 9

The modified syntax table
for motion signaling of Solution One (Option Two)

```
if(sh_slice_type = = B && cbWidth >= 8 && cbHeight >=
        8 && cbWidth < ( 8 * cbHeight) && cbHeight <
        ( 8 * cbWidth ) && cbWidth < 128 && cbHeight <
        128) {
    gpm_flag[ x0 ][ y0 ]                                            ae(v)
    if( gpm_partition_flag[ x0 ][ y0 ] ) {
        gpm_partition_idx[ x0 ][ y0 ]                              ae(v)
    }
    if( sh_slice_type = = B && !gpm_flag[ x0 ][ y0 ] )
    inter_pred_idc[ x0 ][ y0 ]                                      ae(v)
    if( sps_affine_enabled_flag && !gpm_flag[ x0 ][ y0 ] &&
cbWidth >= 16 && cbHeight >= 16 ) {
        inter_affine_flag[ x0 ][ y0 ]                              ae(v)
        if( sps_6param_affine_enabled_flag && inter_affine_flag
        [ x0 ][ y0 ] )
            cu_affine_type_flag[ x0 ][ y0 ]                        ae(v)
    }
    if( sps_smvd_enabled_flag && !ph_mvd_l1_zero_flag &&
            inter_pred_idc[ x0 ][ y0 ] == PRED_BI && ! gpm_
flag[ x0 ][ y0 ] &&
            !inter_affine_flag[ x0 ][ y0 ] && RefIdxSymL0 >
-1 && RefIdxSymL1 > -1 )
        sym_mvd_flag[ x0 ][ y0 ]                                   ae(v)
    if( inter_pred_idc[ x0 ][ y0 ] != PRED_L1 ) {
        if( NumRefIdxActive[ 0 ] > 1 && !sym_mvd_flag[ x0 ]
        [ y0 ] )
            ref_idx_l0[ x0 ][ y0 ]                                 ae(v)
        mvd_coding( x0, y0, 0, 0 )
        if( MotionModelIdc[ x0 ][ y0 ] > 0 )
            mvd_coding( x0, y0, 0, 1 )
        if(MotionModelIdc[ x0 ][ y0 ] > 1)
            mvd_coding(x0, y0, 0, 2 )
        mvp_l0_flag[ x0 ][ y0 ]                                    ae(v)
    } else {
        MvdL0[ x0 ][ y0 ][ 0 ] = 0
        MvdL0[ x0 ][ y0 ][ 1 ] = 0
    }
    if( inter_pred_idc[ x0 ][ y0 ] != PRED_L0 ) {
        if( NumRefIdxActive[ 1 ] > 1 && !sym_mvd_flag[ x0 ]
        [ y0 ] )
            ref_idx_l1[ x0 ][ y0 ]                                 ae(v)
        if( ph_mvd_l1_zero_flag && inter pred_idc[ x0 ][ y0 ] = =
PRED_BI ){
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
                MvdCpL1[ x0 ][ y0 ][ 2 ][ 0 ] = 0
                MvdCpL1[ x0 ][ y0 ][ 2 ][ 1 ] = 0
        } else
            if( sym_mvd_flag[ x0 ][ y0 ] ) {
                MvdL1[ x0 ][ y0 ][ 0 ] = −MvdL0[ x0 ][ y0 ][ 0 ]
                MvdL1[ x0 ][ y0 ][ 1 ] = −MvdL0[ x0 ][ y0 ][ 1 ]
            } else {
                mvd_coding( x0, y0, 1, 0 )
                if( MotionModelIdc[ x0 ][ y0 ] > 0 )
                    mvd_coding( x0, y0, 1, 1 )
                if(MotionModelIdc[ x0 ][ y0 ] > 1 )
                    mvd_coding( x0, y0, 1, 2 )
            }
        mvp_l1_flag[ x0 ][ y0 ]                                    ae(v)
    } else {
        MvdL1[ x0 ][ y0 ][ 0 ] = 0
        MvdL1[ x0 ][ y0 ][ 1 ] = 0
    }
```

In both Table 8 and Table 9, the SMVD mode cannot be combined with the GPM mode. In another example, it is proposed to allow the SMVD mode when the current CU is coded by the GPM mode. When such combination is allowed, by following the same design of the SMVD, the MVD of the two GPM partitions are assumed to be symmetric such that only the MVD of the first GPM partition needs to be signaled and the MVD of the second GPM partition is always symmetric to the first MVD. When such method is applied, the corresponding signaling condition of sym_mvd_flag on gpm_flag can be removed.

As illustrated above, in the first solution, it always assumes L0 MV to be used for the first GPM partition and the L1 MV to be used for the second GPM partition. Such design may not be optimal in the sense that this method prohibits the MVs of two GPM partitions to come from one same prediction list (either L0 or L1). To resolve such problem, one alternative GPM-EMS scheme, Solution Two, is proposed with the signaling design as illustrated in Table 10. In Table 10, newly added syntax elements are italic bold. As shown in Table 10, the flag gpm_flag is firstly signaled. When the flag is equal to 1 (i.e., the GPM is enabled), the syntax gpm_partition_idx is signaled to specify the selected GPM mode. Then, one additional flag gpm_pred_dir_flag0 is signaled to indicate the corresponding prediction list that the MV of the first GPM partition is from. When the flag gpm_pred_dir_flag0 is equal to 1, it indicates that the MV of the first GPM partition comes from L1; otherwise (the flag is equal to 0), it indicates that the MV of the first GPM partition comes from L0. After that, the existing syntax elements ref_idx_l0, mvp_l0_flag and mvd_coding( ) are utilized to signal the values of reference picture index, mvp index and the MVD of the first GPM partition. On the other hand, similar to the first geometric partition, another syntax element gpm_pred_dir_flag1 is introduced to select the corresponding prediction list of the second GPM partition, followed by the existing syntax elements ref_idx_l1, mvp_l1_flag and mvd coding( ) to be used for deriving the MV of the second GPM partition.

TABLE 10

The modified syntax table for motion signaling of Solution Two

```
if(sh_slice_type = = B && cbWidth >= 8 && cbHeight >=
        8 && cbWidth < (8 * cbHeight ) && cbHeight <
        ( 8 * cbWidth ) && cbWidth < 128 &&
        cbHeight < 128) {
    gpm_flag[ x0 ][ y0 ]                                           ae(v)
    if( gpm_partition_flag[ x0 ][ y0 ] ) {
        gpm_partition_idx[ x0 ][ y0 ]                             ae(v)
        gpm_pred_dir_flag0[ x0 ][ y0 ]                            ae(v)
        ref_idx_l0[ x0 ][ y0 ]                                    ae(v)
        mvd_coding( x0, y0, 0, 0 )
        mvp_l0_flag[ x0 ][ y0 ]                                   ae(v)
        gpm_pred_dir_flag1[ x0 ][ y0 ]                            ae(v)
        ref_idx_l1[ x0 ][ y0 ]                                    ae(v)
        mvd_coding( x0, y0, 0, 0 )
        mvp_l1_flag[ x0 ][ y0 ]                                   ae(v)
    } else {
        if( sh_slice_type = = B )
        inter_pred_idc[ x0 ][ y0 ]                                ae(v)
    if( sps_affine_enabled flag && cbWidth >= 16 && cbHeight >=
16 ) {
        inter_affine_flag[ x0 ][ y0 ]                             ae(v)
        if( sps_6param_affine_enabled_flag && inter_affine_flag
        [ x0 ][ y0 ] )
            cu_affine_type_flag[ x0 ][ y0 ]                       ae(v)
    }
    if( sps_smvd_enabled_flag && !ph_mvd_l1_zero_flag &&
            inter_pred_idc[ x0 ][ y0 ] = = PRED_BI &&
            !inter_affine_flag[ x0 ][ y0 ] && RefIdxSymL0 > -1
&& RefIdxSymL1 > -1 )
        sym_mvd_flag[ x0 ][ y0 ]                                  ae(v)
    if( inter_pred_idc[ x0 ][ y0 ] != PRED_L1 ) {
        if( NumRefIdxActive[ 0 ] > 1 && !sym_mvd_flag[ x0 ]
        [ y0 ] )
            ref_idx_l0[ x0 ][ y0 ]                                ae(v)
        mvd_coding( x0, y0, 0, 0 )
        if( MotionModelIdc[ x0 ][ y0 ] > 0 )
            mvd_coding( x0, y0, 0, 1 )
        if(MotionModelIdc[ x0 ][ y0 ] > 1 )
```

TABLE 10-continued

The modified syntax table for motion signaling of Solution Two

```
            mvd_coding( x0, y0, 0, 2 )
            mvp_l0_flag[ x0 ][ y0 ]                                    ae(v)
        } else {
            MvdL0[ x0 ][ y0 ][ 0 ] = 0
            MvdL0[ x0 ][ y0 ][ 1 ] = 0
        }
    }
    if( inter_pred_idc[ x0 ][ y0 ] != PRED_L0 ) {
        if( NumRefIdxActive[ 1 ] > 1 && !sym_mvd_flag[ x0 ]
        [ y0 ] )
            ref_idx_l1[ x0 ][ y0 ]                                    ae(v)
        if( ph_mvd_l1_zero_flag && inter_pred_idc[ x0 ][ y0 ] = =
        PRED_BI ){
            MvdL1[ x0 ][ y0 ][ 0 ] = 0
            MvdL1[ x0 ][ y0 ][ 1 ] = 0
            MvdCpL1[ x0 ][ y0 ][ 0 ][ 0 ] = 0
            MvdCpL1[ x0 ][ y0 ][ 0 ][ 1 ] = 0
            MvdCpL1[ x0 ][ y0 ][ 1 ][ 0 ] = 0
            MvdCpL1[ x0 ][ y0 ][ 1 ][ 1 ] = 0
            MvdCpL1[ x0 ][ y0 ][ 2 ][ 0 ] = 0
            MvdCpL1[ x0 ][ y0 ][ 2 ][ 1 ] = 0
        } else
            if( sym_mvd_flag[ x0 ][ y0 ] ) {
                MvdL1[ x0 ][ y0 ][ 0 ] = −MvdL0[ x0 ][ y0 ][ 0 ]
                MvdL1[ x0 ][ y0 ][ 1 ] = −MvdL0[ x0 ][ y0 ][ 1 ]
            } else {
                mvd_coding( x0, y0, 1, 0 )
                if( MotionModelIdc[ x0 ][ y0 ] > 0 )
                    mvd_coding( x0, y0, 1, 1 )
                if(MotionModelIdc[ x0 ][ y0 ] > 1 )
                    mvd_coding( x0, y0, 1, 2 )
            }
            mvp_l1_flag[ x0 ][ y0 ]                                   ae(v)
    } else {
        MvdL1[ x0 ][ y0 ][ 0 ] = 0
        MvdL1[ x0 ][ y0 ][ 1 ] = 0
    }
}
```

At last, it should be mentioned that given that the GPM mode consists of two uni-prediction partitions (except the blending samples on the split edge), some existing coding tools in the VVC and AVS3 that are specifically designed for bi-prediction, e.g., bi-directional optical flow, decoder-side motion vector refinement (DMVR) and bi-prediction with CU weights (BCW) can be automatically bypassed when the proposed GPM-EMS schemes are enabled for one inter CU. For instance, when one of the proposed GPM-EMS is enabled for one CU, the corresponding BCW weight need not to be further signaled for the CU to reduce signaling overhead given that the BCW cannot be applied to GPM mode.

The Combination of the GPM-MVR and GPM-EMS

In this section, it is proposed to combine the GPM-MVR and GPM-EMS for one CU with geometry partition. Specifically, different from either GPM-MVR or GPM-EMS where only one of merge-based motion signaling or explicit signaling can be applied to signal the uni-prediction MV of two GPM partitions, in the proposed scheme, it allows 1) one partition using GPM-MVR based motion signaling and the other using GPM-EMS based motion signaling; or 2) two partitions using GPM-MVR based motion signaling; or 3) two partitions using GPM-EMS based motion signaling. Using the GPM-MVR signaling in Table 4 and GPM-EMS in Table 10, Table 11 shows the corresponding syntax table after the proposed GPM-MVR and GPM-EMS are combined. In Table 11, newly added syntax elements are italic bold. As shown in Table 11, two additional syntax elements gpm_merge_flag0 and gpm_merge_flag1 are introduced respectively for partitions #1 and #2, which specify the corresponding partitions use GPM-MVR based merge signaling or GPM-EMS based explicit signaling. When the flag is one, it means that the GPM-MVR base signaling is enabled for the partition whose GPM uni-prediction motion will be signaled through merge_gpm_idxX, gpm_mvr_partIdxX_enabled_flag, gpm_mvr_partIdxX_direction_idx and gpm_mvr_partIdxX_distance_idx, where X=0, 1. Otherwise, if the flag is zero, it means that the uni-prediction motion of the partition will be signaled explicitly by GPM-EMS manner using the syntax elements gpm_pred_dir_flagX, ref_idx_1X, mvp_1X_flag and mvd_1X, where X=0, 1.

TABLE 11

The proposed syntax table for GPM mode with the combination of GPM-MVR and GPM-EMS

| | Descriptor |
|---|---|
| merge_data( x0, y0, cbWidth, cbHeight, chType ) { | |
| ...... | |
|   if( !ciip_flag[ x0 ][ y0 ] ) { | |
|     gpm_partition_idx[ x0 ][ y0 ] | ae(v) |
|     gpm_merge_flag0[ x0 ][ y0 ] | ae(v) |
|     if( gpm_merge_flag0[ x0 ][ y0 ] ) { | |
|       merge_gpm_idx0[ x0 ][ y0 ] | ae(v) |
|       gpm_mvr_partIdx0_enable_flag[ x0 ][ y0 ] | ae(v) |
|       if( gpm_mvr_partIdx0_enable_flag[ x0 ][ y0 ] ) { | |
|         gpm_mvr_partIdx0_directoin_idx[ x0 ][ y0 ] | ae(v) |
|         gpm_mvr_partIdx0_distance_idx[ x0 ][ y0 ] | ae(v) |
|       } | |
|     }else{ | |
|       gpm_pred_dir_flag0[ x0 ][ y0 ] | ae(v) |
|       ref_idx_l0[ x0 ][ y0 ] | ae(v) |
|       mvd_coding( x0, y0, 0, 0 ) | |
|       mvp_l0_flag[ x0 ][ y0 ] | ae(v) |
|     } | |
|     gpm_merge_flag1[ x0 ][ y0 ] | ae(v) |
|     if( gpm_merge_flag1[ x0 ][ y0 ] ) { | |
|       merge_gpm_idx1[ x0 ][ y0 ] | ae(v) |
|       gpm_mvr_partIdx1_enable_flag[ x0 ][ y0 ] | ae(v) |
|       if( gpm_mvr_partIdx1_enable_flag[ x0 ][ y0 ] ) { | |
|         gpm_mvr_partIdx1_directoin_idx[ x0 ][ y0 ] | ae(v) |
|         gpm_mvr_partIdx1_distance_idx[ x0 ][ y0 ] | ae(v) |
|       } | |
|     }else{ | |
|       gpm_pred_dir_flag1[ x0 ][ y0 ] | ae(v) |
|       ref_idx_l1[ x0 ][ y0 ] | ae(v) |
|       mvd_coding( x0, y0, 0, 0 ) | |
|       mvp_1l_flag[ x0 ][ y0 ] | ae(v) |
|     } | |
|   ...... | |
| } | |

The Combination of the GPM-MVR with the Template Matching

In this section, different solutions are provided to combine the GPM-MVR with the templating matching.

In method one, when one CU is coded in GPM mode, it is proposed to signal two separate flags for two GPM partitions, each indicating whether the uni-directional motion of the corresponding partition is further refined by template matching or not. When the flag is enabled, a template is generated using the left and top neighboring reconstructed samples of the current CU; then, the uni-directional motion of the partition will be refined by minimizing the difference between the template and its reference samples following the same procedure as introduced in the section "template matching". Otherwise (when the flag is disabled), the template matching is not applied to the partition, the GPM-MVR may be further applied. Using the GPM-MVR signaling method in Table 5 as an example, Table 11 illustrates the corresponding syntax table when the GPM-MVR is combined with template matching.

TABLE 11

The syntax elements of the proposed method of combining the GPM-MVR with template matching (Method One)

|  | Descriptor |
| --- | --- |
| merge_data( x0, y0, cbWidth, cbHeight, chType ) { | |
| ...... | |
| if( !ciip_flag[ x0 ][ y0 ] ) { | |
| merge_gpm_partition_idx[ x0 ][ y0 ] | ae(v) |
| gpm_tm_enable_flag0[ x0 ][ y0 ] | ae(v) |
| if( !gpm_tm_enable_flag0 ) { | |
| gpm_mvr_partIdx0_enable_flag[ x0 ][ y0 ] | ae(v) |
| } | |
| if( gpm_mvr_partIdx0_enable_flag[ x0 ][ y0 ] ) { | |
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| gpm_tm_enable_flag1[ x0 ][ y0 ] | ae(v) |
| if( !gpm_tm_enable_flag1 ) { | |
| gpm_mvr_partIdx1_enable_flag[ x0 ][ y0 ] | ae(v) |
| } | |
| if( gpm_mvr_partIdx1_enable_flag[ x0 ][ y0 ] ) { | |
| gpm_mvr_partIdx1_direction_idx[ x0 ][ y0 ] | ae(v) |
| gpm_mvr_partIdx1_distance_idx[ x0 ][ y0 ] | ae(v) |
| } | |
| } | |
| merge_gpm_idx0[ x0 ][ y0 ] | ae(v) |
| merge_gpm_idx1[ x0 ][ y0 ] | ae(v) |
| ...... | |
| } | |

As show in Table 11, in the proposed scheme, two additional flags gpm_tm_enable_flag0 and gpm_tm_enable_flag1 are firstly signaled to indicate whether motion is refined for the two GPM partitions, respectively. When the flag is one, it indicates the TM is applied to refine the uni-directional MV of one partition. When the flag is zero, one flag (gpm_mvr_partIdx0_enable_flag or gpm_mvr_partIdx1_enable_flag) is further signaled to indicate whether the GPM-MVR is applied to the GPM partition, respectively. When the flag of one GPM partition is equal to one, the distance index (as indicated by the syntax elements gpm_mvr_partIdx0_distance_idx and gpm_mvr_partIdx1_distance_idx) and the direction index (as indicated by the syntax elements gpm_mvr_partIdx0_direction_idx and gpm_mvr_partIdx1_distance_idx) are signaled to specify the direction of the MVR. After that, the existing syntax merge_gpm_idx0 and merge_gpm_idx1 are signaled to identify the uni-directional MVs for two GPM partitions. Meanwhile, similar to the signaling conditions that are applied to Table 5, the following conditions may be applied to ensure that the resulting MVs used for the predictions of the two GPM partitions are not identical.

First, when both the values of gpm_tm_enable_flag0 and gpm_tm_enable_flag1 are equal to 1 (i.e., the TM is enabled for both two GPM partitions), the values of merge_gpm_idx0 and merge_gpm_idx1 cannot be the same.

Second, when one of gpm_tm_enable_flag0 and gpm_tm_enable_flag1 is one and the other is zero, the values of merge_gpm_idx0 and merge_gpm_idx1 are allowed to the same.

Otherwise, i.e., both gpm_tm_enable_flag0 and gpm_tm_enable_flag1 are equal to one: first, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same; second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical; third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical; fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, and gpm_mvr_partIdx1_direction_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above method one, the TM and MVR are applied to the GPM exclusively. In such scheme, it is prohibited to further apply the MVR on top of the refined MVs of the TM mode. Therefore, to further provide more MV candidates for the GPM, Method Two is proposed to enable the application of the MVR offset on top of the TM refined MVs. Table 12 illustrates the corresponding syntax table when the GPM-MVR is combined with template matching.

TABLE 12

The syntax elements of the proposed method of combining the GPM-MVR with template matching (Method Two)

|  | Descriptor |
| --- | --- |
| merge_data( x0, y0, cbWidth, cbHeight, chType ) { | |
| ...... | |
| if( !ciip_flag[ x0 ][ y0 ] ) { | |
| merge_gpm_partition_idx[ x0 ][ y0 ] | ae(v) |
| gpm_tm_enable_flag0[ x0 ][ y0 ] | ae(v) |
| gpm_mvr_partIdx0_enable_flag[ x0 ][ y0 ] | ae(v) |
| if( gpm_mvr_partIdx0_enable_flag[ x0 ][ y0 ] ) { | |
| gpm_mvr_partIdx0_directoin_idx[ x0 ][ y0 ] | ae(v) |
| gpm_mvr_partIdx0_distance_idx[ x0 ][ y0 ] | ae(v) |
| } | |
| gpm_tm_enable_flag1[ x0 ][ y0 ] | ae(v) |
| gpm_mvr_partIdx1_enable_flag[ x0 ][ y0 ] | ae(v) |
| if( gpm_mvr_partIdx1_enable_flag[ x0 ][ y0 ] ) { | |
| gpm_mvr_partIdx1_direction_idx[ x0 ][ y0 ] | ae(v) |
| gpm_mvr_partIdx1_distance_idx[ x0 ][ y0 ] | ae(v) |
| } | |
| } | |

TABLE 12-continued

The syntax elements of the proposed method of combining the
GPM-MVR with template matching (Method Two)

| | De-scriptor |
|---|---|
| merge_gpm_idx0[ x0 ][ y0 ] | ae(v) |
| merge_gpm_idx1[ x0 ][ y0 ] | ae(v) |
| ...... | |
| } | |

As shown in Table 12, different from Table 11, the signaling condition of gpm_mvr_partIdx0_enable_flag and gpm_mvr_partIdx1_enable_flag on gpm_tm_enable_flag0 and gpm_tm_enable_flag1 are removed. Such that, no matter whether the TM is applied to refine the uni-directional motion of one GPM partition or not, the MV refinements are always allowed to apply to the MV of the GPM partition. Similar as before, the following conditions should be applied to ensure the resulting MVs of two GPM partitions are not identical.

First, when one of gpm_tm_enable_flag0 and gpm_tm_enable_flag1 is one and the other is zero, the values of merge_gpm_idx0 and merge_gpm_idx1 are allowed to the same.

Otherwise, i.e., both gpm_tm_enable_flag0 and gpm_tm_enable_flag1 are equal to one, or both the flags are equal to zero: first, when both the values of gpm_mvr_partIdx0_enable_flag and gpm_mvr_partIdx1_enable_flag are equal to 0 (i.e., the GPM-MVR is disabled for both two GPM partitions), the values of merge_gpm_idx0 and merge_gpm_idx1 cannot be the same; second, when gpm_mvr_partIdx0_enable_flag is equal to 1 (i.e., the GPM-MVR is enabled for the first GPM partition) and gpm_mvr_partIdx1_enable_flag is equal to 0 (i.e., the GPM-MVR is disabled for the second GPM partition), the values of merge_gpm_idx0 and merge_gpm_idx1 are allowed to be identical; third, when gpm_mvr_partIdx0_enable_flag is equal to 0 (i.e., the GPM-MVR is disabled for the first GPM partition) and gpm_mvr_partIdx1_enable_flag is equal to 1 (i.e., the GPM-MVR is enabled for the second GPM partition), the values of merge_gpm_idx0 and merge_gpm_idx1 are allowed to be identical; fourth, when both the values of gpm_mvr_partIdx0_enable_flag and gpm_mvr_partIdx1_enable_flag are equal to 1 (i.e., the GPM-MVR is enabled for both two GPM partitions), the determination on whether the values of merge_gpm_idx0 and merge_gpm_idx1 are allowed to be identical or not is dependent on the values of the MVRs (as indicated by gpm_mvr_partIdx0_direction_idx and gpm_mvr_partIdx0_distance_idx, gpm_mvr_partIdx1_distance_idx and gpm_mvr_partIdx1_distance_idx) that are applied to the two GPM partitions. If the values of two MVRs are equal, merge_gpm_idx0 and merge_gpm_idx1 are disallowed to be identical. Otherwise (the values of two MVRs are unequal), the values of merge_gpm_idx0 and merge_gpm_idx1 are allowed to be identical.

In the above two methods, two separate flags need to be signaled to indicate whether the TM is applied to each GPM partition or not. The added signaling may reduce the overall coding efficiency due to the additional overhead, especially at low bit-rate. To reduce the signaling overhead, instead of introducing additional signaling, Method Three is proposed to insert the TM-based uni-directional MVs into the uni-directional MV candidate list of the GPM mode. The TM-based uni-directional MVs are generated following the same TM process as described in the section "template matching" and using the original uni-directional MV of the GPM as the initial MV. By such scheme, there is no need to further signal extra control flags from encoder to decoder. Instead, the decoder can identify whether one MV is refined by the TM or not through the corresponding merge indices (i.e., merge_gpm_idx0 and merge_gpm_idx1) received from the bitstream. There may be different methods to arrange the regular GPM MV candidates (i.e., non-TM) and the TM-based MV candidates. In one method, it is proposed to put the TM-based MV candidates at the beginning of the MV candidate list followed by the non-TM-based MV candidates. In another method, it is proposed to firstly put the non-TM-based MV candidates at the beginning followed by the TM-based candidates. In another method, it is proposed to put the TM-based MV candidates and non-TM-based MV candidates in an interleaved manner. For example, it can put the first N non-TM-based candidates; then all TM-based candidates; finally, the rest non-TM-based candidates. In another example, it can put the first N TM-based candidates; then, all non-TM-based candidates; finally, the rest TM-based candidates. In another example, it is proposed to put the non-TM-based candidates and the TM-based candidates one by the other, i.e., one non-TM-based candidate, one TM-based candidate, etc.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

FIG. 10 shows a computing environment (or a computing device) 1010 coupled with a user interface 1060. The computing environment 1010 can be part of a data processing server. In some embodiments, the computing device 1010 can perform any of various methods or processes (such as encoding/decoding methods or processes) as described hereinbefore in accordance with various examples of the present disclosure. The computing environment 1010 may include a processor 1020, a memory 1040, and an I/O interface 1050.

The processor 1020 typically controls overall operations of the computing environment 1010, such as the operations associated with the display, data acquisition, data communications, and image processing. The processor 1020 may include one or more processors to execute instructions to perform all or some of the steps in the above-described methods. Moreover, the processor 1020 may include one or more modules that facilitate the interaction between the processor 1020 and other components. The processor may be a Central Processing Unit (CPU), a microprocessor, a single chip machine, a GPU, or the like.

The memory 1040 is configured to store various types of data to support the operation of the computing environment 1010. Memory 1040 may include predetermine software 1042. Examples of such data include instructions for any applications or methods operated on the computing environment 1010, video datasets, image data, etc. The memory 1040 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1050 provides an interface between the processor 1020 and peripheral interface modules, such as a keyboard, a click wheel, buttons, and the like. The buttons may include but are not limited to, a home button, a start scan button, and a stop scan button. The I/O interface 1050 can be coupled with an encoder and decoder.

In some embodiments, there is also provided a non-transitory computer-readable storage medium comprising a plurality of programs, such as comprised in the memory 1040, executable by the processor 1020 in the computing environment 1010, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1010 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

FIG. 8 is a flowchart illustrating a method for decoding a video block in GPM according to an example of the present disclosure.

In step 801, the processor 1020 may partition the video block into a first geometric partition and a second geometric partition.

In step 802, the processor 1020 may receive a first TM enable flag for the first geometric partition and may obtain a second TM enable flag for the second geometric partition.

In some examples, the first TM enable flag indicates whether a uni-directional motion of the first geometric partition is refined by TM, and wherein the second TM enable flag indicates whether a uni-directional motion of the second geometric partition is refined by the TM. For examples, the first TM enable flag may be the flag gpm_tm_enable_flag0 as shown in Table 11 or 12, and the second TM enable flag may be the flag gpm_tm_enable_flag1 as shown in Table 11 or 12.

In step 803, the processor 1020 may receive a first merge GPM index for the first geometric partition and a second merge GPM index for the second geometric partition.

In some examples, the first merge GPM index identifies a uni-directional MV for the first geometric partition and the second merge GPM index identifies a uni-directional MV for the second geometric partition.

In some examples, the first merge GPM index may be the syntax element merge_gpm_idx0 as shown in Table 11 or 12, and the second merge GPM index may be the syntax element merge_gpm_idx1 as shown in Table 11 or 12.

In step 804, the processor 1020 may construct a uni-directional MV candidate list of the GPM.

In step 805, the processor 1020 may generate a uni-directional MV for the first geometric partition and a uni-directional MV for the second geometric partition.

In some examples, as shown in Table 11, the processor 1020 may determine that the TM is applied to refine the uni-directional MV of the first geometric partition and an MVR is not applied for the first geometric partition in response to determining that the first TM enable flag is equal to 1.

In some examples, as shown in Table 11, the processor 1020 may receive a first GPM with MVR (GPM-MVR) enable flag for the first geometric partition in response to determining that the first TM enable flag is equal to 0, where the first GPM-MVR enable flag may indicate whether the GPM-MVR is applied to the first geometric partition. The first GPM-MVR enable flag may be gpm_tm_enable_flag0 as shown in Table 11.

In some examples, as shown in Table 11, the processor 1020 may receive the first GPM-MVR distance index and the first GPM-MVR direction index for the first geometric partition in response to determining that the first GPM-MVR enable flag is equal to 1. The first GPM-MVR distance index and the first GPM-MVR direction index may respectively specify a direction of the MVR for the first geometric partition, as shown in Table 11.

In some examples, as shown in Table 11, the processor 1020 may determine that the TM is applied to refine the uni-directional MV of the second geometric partition and the MVR is not applied for the second geometric partition in response to determining that the second TM enable flag is equal to 1.

In some examples, as shown in Table 11, the processor 1020 may receive a second GPM with motion vector refinement (GPM-MVR) enable flag for the second geometric partition in response to determining that the second TM enable flag is equal to 0. The second GPM-MVR enable flag may indicate whether the GPM-MVR is applied to the second geometric partition.

In some examples, as shown in Table 11, the processor 1020 may receive a second GPM-MVR distance index and a second GPM-MVR direction index for the first geometric partition in response to determining that the second GPM-MVR enable flag is equal to 1. The second GPM-MVR distance index and the second GPM-MVR direction index may respectively specify a direction of the MVR for the second geometric partition.

In some examples, the processor 1020 may further constrain the first merge GPM index and the second merge GPM index based on the first TM enable flag and the second TM enable flag.

In some examples, the processor 1020 may determine that the first merge GPM index and the second merge GPM index are different in response to determining that the first TM enable flag and the second TM enable flag are respectively equal to 1.

In some examples, the processor 1020 may determine that the first merge GPM index and the second merge GPM index are allowed to be identical in response to determining that one of the first TM enable flag and the second TM enable flag is equal to 1 and the other is equal to 0. In some examples, when the first merge GPM index and the second merge GPM index are allowed to be identical, the first merge GPM index and the second merge GPM index may be the same or may be different.

For example, in some examples, when one of gpm_tm_enable_flag0 and gpm_tm_enable_flag1 is one and the other is zero, the values of merge_gpm_idx0 and merge_gpm_idx1 may be the same. In some examples, when one of gpm_tm_enable_flag0 and gpm_tm_enable_flag1 is one and the other is zero, the values of merge_gpm_idx0 and merge_gpm_idx1 may be different.

In some examples, the processor 1020 may further constrain the first merge GPM index and the second merge GPM index based on the first GPM-MVR enable flag and the second GPM-MVR enable flag in response to determining the first TM enable flag and the second TM enable flag are respectively equal to 1.

For example, the processor 1020 may determine that the first merge GPM index and the second merge GPM index are different in response to determining that the first GPM-MVR enable flag and the second GPM-MVR enable flag are respectively equal to 0.

For example, the processor 1020 may determine that the first merge GPM index and the second merge GPM index are allowed to be identical in response to determining that the first GPM-MVR enable flag is equal to 1 and the second GPM-MVR enable flag is equal to 0 or in response to determining that the first GPM-MVR enable flag is equal to 0 and the second GPM-MVR enable flag is equal to 1. In some examples, when the first merge GPM index and the second merge GPM index are allowed to be identical, the first merge GPM index and the second merge GPM index may be the same or may be different.

For example, the processor 1020 may determine the first merge GPM index and the second merge GPM index based on a first MVR for the first geometric partition and a second MVR for the second geometric partition in response to determining that the first GPM-MVR enable flag and the second GPM-MVR enable flag are respectively equal to 1.

In some examples, the processor 1020 may determine that the first merge GPM index and the second merge GPM index are different in response to determining that the first MVR is equal to the second MVR.

In some examples, the processor 1020 may determine that the first merge GPM index and the second merge GPM index are allowed to be identical in response to determining that the first MVR is not equal to the second MVR. In some examples, when the first merge GPM index and the second merge GPM index are allowed to be identical, the first merge GPM index and the second merge GPM index may be the same or may be different.

In some examples, the processor 1020 may further constrain the first merge GPM index and the second merge GPM index based on the first TM enable flag and the second TM enable flag, as shown in Table 12.

For example, the processor 1020 may determine that the first merge GPM index and the second merge GPM index are allowed to be identical in response to determining that one of the first TM enable flag and the second TM enable flag is equal to 1 and the other is equal to 0.

For example, the processor 1020 may constrain the first merge GPM index and the second merge GPM index based on a first GPM motion vector refinement (GPM-MVR) enable flag for the first geometric partition and a second GPM-MVR enable flag for the second geometric partition in response to determining that both the first TM enable flag and the second TM enable flag are equal to 0 or both the first TM enable flag and the second TM enable flag are equal to 1. The first GPM-MVR enable flag may indicate whether the GPM-MVR is applied to the first geometric partition and the second GPM-MVR enable flag may indicate whether the GPM-MVR is applied to the second geometric partition.

In some examples, the processor 1020 may determine that the first merge GPM index and the second merge GPM index are different in response to determining that the first GPM-MVR enable flag and the second GPM-MVR enable flag are 0.

In some examples, the processor 1020 may determine that the first merge GPM index and the second merge GPM index are allowed to be identical in response to determining that the first GPM-MVR enable flag is equal to 1 and the second GPM-MVR enable flag is equal to 0 or in response to determining that the first GPM-MVR enable flag is equal to 0 and the second GPM-MVR enable flag is equal to 1. When the first merge GPM index and the second merge GPM index are allowed to be identical, the first merge GPM index and the second merge GPM index may be the same or may be different.

In some examples, the processor 1020 may determine the first merge GPM index and the second merge GPM index based on a first motion vector refinement (MVR) for the first geometric partition and a second MVR for the second geometric partition in response to determining that the first GPM-MVR enable flag and the second GPM-MVR enable flag are respectively equal to 1.

In some examples, the processor 1020 may determine that the first merge GPM index and the second merge GPM index are different in response to determining that the first MVR is equal to the second MVR. Further, the processor 1020 may determine that the first merge GPM index and the second merge GPM index are allowed to be identical in response to determining that the first MVR is not equal to the second MVR.

FIG. 9 is a flowchart illustrating a method for decoding a video block in GPM according to an example of the present disclosure.

In step 901, the processor 1020 may partition the video block into a first geometric partition and a second geometric partition.

In step 902, the processor 1020 may construct a uni-directional MV candidate list of the GPM.

In step 903, the processor 1020 may receive a first merge GPM index for the first geometric partition and a second merge GPM index for the second geometric partition.

In some examples, the first merge GPM index may be the syntax element merge_gpm_idx0 as shown in Table 11 or 12, and the second merge GPM index may be the syntax element merge_gpm_idx1 as shown in Table 11 or 12, In step 904, the processor 1020 may update the uni-directional MV candidate list based on the first merge GPM index and the second merge GPM index.

In some examples, the first merge GPM index and the second merge GPM index indicate whether one uni-directional MV is refined by TM.

In some examples, the processor 1020 may generate a TM-based uni-directional MV based on an original uni-directional MV of the GPM as an initial MV and obtain an updated uni-directional MV candidate list by adding the TM-based uni-directional MV into the uni-directional MV candidate list. The first merge GPM index and the second merge GPM index may indicate the TM-based uni-directional MV.

In some examples, the processor 1020 may add the TM-based uni-directional MV into the uni-directional MV candidate list by one of following operations: adding the TM-based uni-directional MV at the beginning of the uni-directional MV candidate list such that non TM-based uni-directional MVs follow the TM-based uni-directional MV; adding the TM-based uni-directional MV into the uni-directional MV candidate list such that the TM-based uni-directional MV follows the non TM-based uni-directional MVs in the uni-directional MV candidate list; or adding the TM-based uni-directional MV into the uni-directional MV candidate list such that the TM-based uni-directional MV and the non TM-based uni-directional MVs are arranged in an interleaved manner in the uni-directional MV candidate list.

In some examples, there is provided an apparatus for decoding a video block in GPM. The apparatus includes a processor 1020 and a memory 1040 configured to store instructions executable by the processor; where the processor, upon execution of the instructions, is configured to perform a method as illustrated in FIG. 8 or 9.

In some other examples, there is provided a non-transitory computer readable storage medium, having instructions stored therein. When the instructions are executed by a processor 1020, the instructions cause the processor to perform a method as illustrated in FIG. 8 or 9.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for decoding a video block in geometry partition mode (GPM), comprising:
   partitioning the video block into a first geometric partition and a second geometric partition;
   receiving a first template matching (TM) enable flag for the first geometric partition and a second TM enable flag for the second geometric partition, wherein the first TM enable flag indicates whether a uni-directional motion vector of the first geometric partition is refined by TM, and wherein the second TM enable flag indicates whether a uni-directional motion vector of the second geometric partition is refined by the TM;
   receiving a first merge GPM index for the first geometric partition and a second merge GPM index for the second geometric partition;
   constructing a uni-directional motion vector (MV) candidate list of the GPM;
   generating a uni-directional MV for the first geometric partition and a uni-directional MV for the second geometric partition;
   in response to determining that the first TM enable flag is equal to 1, determining that the TM is applied to refine the uni-directional MV of the first geometric partition and a motion vector refinement (MVR) is not applied to the first geometric partition; and
   in response to determining that the first TM enable flag is equal to 0, receiving a first GPM with MVR (GPM-MVR) enable flag for the first geometric partition, wherein the first GPM-MVR enable flag indicates whether the GPM-MVR is applied to the first geometric partition.

2. The method of claim 1, further comprising:
   in response to determining that the first GPM-MVR enable flag is equal to 1, receiving a first GPM-MVR distance index and a first GPM-MVR direction index for the first geometric partition, wherein the first GPM-MVR distance index and the first GPM-MVR direction index specify a direction of the MVR for the first geometric partition.

3. The method of claim 2, further comprising:
   in response to determining that the second TM enable flag is equal to 1, determining that the TM is applied to refine the uni-directional MV of the second geometric partition and the motion vector refinement (MVR) is not applied to the second geometric partition; and
   in response to determining that the second TM enable flag is equal to 0, receiving a second GPM with motion vector refinement (GPM-MVR) enable flag for the second geometric partition, wherein the second GPM-MVR enable flag indicates whether the GPM-MVR is applied to the second geometric partition.

4. The method of claim 3, further comprising:
   in response to determining that the second GPM-MVR enable flag is equal to 1, receiving a second GPM-MVR distance index and a second GPM-MVR direction index for the first geometric partition, wherein the second GPM-MVR distance index and the second GPM-MVR direction index specify a direction of the MVR for the second geometric partition.

5. The method of claim 4, further comprising:
   constraining the first merge GPM index and the second merge GPM index based on the first TM enable flag and the second TM enable flag.

6. The method of claim 5, wherein constraining the first merge GPM index and the second merge GPM index based on the first TM enable flag and the second TM enable flag comprises:
   in response to determining that the first TM enable flag and the second TM enable flag are respectively equal to 1, determining that the first merge GPM index and the second merge GPM index are different; and
   in response to determining that one of the first TM enable flag and the second TM enable flag is equal to 1 and the other is equal to 0, determining that the first merge GPM index and the second merge GPM index are allowed to be identical.

7. The method of claim 5, further comprising:
   in response to determining the first TM enable flag and the second TM enable flag are respectively equal to 1, constraining the first merge GPM index and the second merge GPM index based on the first GPM-MVR enable flag and the second GPM-MVR enable flag.

8. The method of claim 7, wherein constraining the first merge GPM index and the second merge GPM index based on the first GPM-MVR enable flag and the second GPM-MVR enable flag comprises:
   in response to determining that the first GPM-MVR enable flag and the second GPM-MVR enable flag are respectively equal to 0, determining that the first merge GPM index and the second merge GPM index are different;
   in response to determining that the first GPM-MVR enable flag is equal to 1 and the second GPM-MVR enable flag is equal to 0, determining that the first merge GPM index and the second merge GPM index are allowed to be identical;
   in response to determining that the first GPM-MVR enable flag is equal to 0 and the second GPM-MVR enable flag is equal to 1, determining that the first merge GPM index and the second merge GPM index are allowed to be identical; and in response to determining that the first GPM-MVR enable flag and the second GPM-MVR enable flag are respectively equal to 1, determining the first merge GPM index and the second merge GPM index based on a first motion vector refinement (MVR) for the first geometric partition and a second MVR for the second geometric partition.

9. The method of claim 8, further comprising:

in response to determining that the first MVR is equal to the second MVR, determining that the first merge GPM index and the second merge GPM index are different; and in response to determining that the first MVR is not equal to the second MVR, determining that the first merge GPM index and the second merge GPM index are allowed to be identical.

10. The method of claim 1, further comprising:

constraining the first merge GPM index and the second merge GPM index based on the first TM enable flag and the second TM enable flag.

11. The method of claim 10, wherein constraining the first merge GPM index and the second merge GPM index based on the first TM enable flag and the second TM enable flag comprises:

in response to determining that one of the first TM enable flag and the second TM enable flag is equal to 1 and the other is equal to 0, determining that the first merge GPM index and the second merge GPM index are allowed to be identical; and in response to determining that both the first TM enable flag and the second TM enable flag are equal to 0 or both the first TM enable flag and the second TM enable flag are equal to 1, constraining the first merge GPM index and the second merge GPM index based on a first GPM motion vector refinement (GPM-MVR) enable flag for the first geometric partition and a second GPM-MVR enable flag for the second geometric partition, wherein the first GPM-MVR enable flag indicates whether the GPM-MVR is applied to the first geometric partition and wherein the second GPM-MVR enable flag indicates whether the GPM-MVR is applied to the second geometric partition.

12. The method of claim 11, wherein constraining the first merge GPM index and the second merge GPM index based on the first GPM-MVR enable flag for the first geometric partition and the second GPM-MVR enable flag for the second geometric partition comprises:

in response to determining that the first GPM-MVR enable flag and the second GPM-MVR enable flag are 0, determining that the first merge GPM index and the second merge GPM index are different;

in response to determining that the first GPM-MVR enable flag is equal to 1 and the second GPM-MVR enable flag is equal to 0, determining that the first merge GPM index and the second merge GPM index are allowed to be identical;

in response to determining that the first GPM-MVR enable flag is equal to 0 and the second GPM-MVR enable flag is equal to 1, determining that the first merge GPM index and the second merge GPM index are allowed to be identical; and in response to determining that the first GPM-MVR enable flag and the second GPM-MVR enable flag are respectively equal to 1, determining the first merge GPM index and the second merge GPM index based on a first motion vector refinement (MVR) for the first geometric partition and a second MVR for the second geometric partition.

13. The method of claim 12, further comprising:

in response to determining that the first MVR is equal to the second MVR, determining that the first merge GPM index and the second merge GPM index are different; and in response to determining that the first MVR is not equal to the second MVR, determining that the first merge GPM index and the second merge GPM index are allowed to be identical.

14. An apparatus for video coding, comprising:

one or more processors; and a non-transitory computer-readable storage medium configured to store instructions executable by the one or more processors; wherein the one or more processors, upon execution of the instructions, are configured to perform:

partitioning the video block into a first geometric partition and a second geometric partition;

receiving a first template matching (TM) enable flag for the first geometric partition and a second TM enable flag for the second geometric partition, wherein the first TM enable flag indicates whether a uni-directional motion vector of the first geometric partition is refined by TM, and wherein the second TM enable flag indicates whether a uni-directional motion vector of the second geometric partition is refined by the TM;

receiving a first merge GPM index for the first geometric partition and a second merge GPM index for the second geometric partition;

constructing a uni-directional motion vector (MV) candidate list of the GPM;

generating a uni-directional MV for the first geometric partition and a uni-directional MV for the second geometric partition;

in response to determining that the first TM enable flag is equal to 1, determining that the TM is applied to refine the uni-directional MV of the first geometric partition and a motion vector refinement (MVR) is not applied to the first geometric partition; and in response to determining that the first TM enable flag is equal to 0, receiving a first GPM with MVR (GPM-MVR) enable flag for the first geometric partition, wherein the first GPM-MVR enable flag indicates whether the GPM-MVR is applied to the first geometric partition.

15. The apparatus of claim 14, the one or more processors are further configured to perform:

in response to determining that the first GPM-MVR enable flag is equal to 1, receiving a first GPM-MVR distance index and a first GPM-MVR direction index for the first geometric partition, wherein the first GPM-MVR distance index and the first GPM-MVR direction index specify a direction of the MVR for the first geometric partition.

16. The apparatus of claim 15, the one or more processors are further configured to perform:

in response to determining that the second TM enable flag is equal to 1, determining that the TM is applied to refine the uni-directional MV of the second geometric partition and the motion vector refinement (MVR) is not applied to the second geometric partition; and in response to determining that the second TM enable flag is equal to 0, receiving a second GPM with motion vector refinement (GPM-MVR) enable flag for the second geometric partition, wherein the second GPM-MVR enable flag indicates whether the GPM-MVR is applied to the second geometric partition.

17. The apparatus of claim 16, the one or more processors are further configured to perform:

in response to determining that the second GPM-MVR enable flag is equal to 1, receiving a second GPM-MVR distance index and a second GPM-MVR direction index for the first geometric partition, wherein the second GPM-MVR distance index and the second GPM-MVR direction index specify a direction of the MVR for the second geometric partition.

18. A method for storing a bitstream, comprising:

performing an encoding method to generate a bitstream; and storing the bitstream on a non-transitory computer-readable storage medium, wherein the encoding method comprises:

partitioning the video block into a first geometric partition and a second geometric partition;

determining a first template matching (TM) enable flag for the first geometric partition and a second TM enable flag for the second geometric partition, wherein the first TM enable flag indicates whether a uni-directional motion vector of the first geometric partition is refined by TM, and wherein the second TM enable flag indicates whether a uni-directional motion vector of the second geometric partition is refined by the TM;

determining a first merge GPM index for the first geometric partition and a second merge GPM index for the second geometric partition;

constructing a uni-directional motion vector (MV) candidate list of the GPM; and generating a uni-directional MV for the first geometric partition and a uni-directional MV for the second geometric partition, wherein when the first TM enable flag is equal to 1, the first TM enable flag indicates the TM is applied to refine the uni-directional MV of the first geometric partition and a motion vector refinement (MVR) is not applied to the first geometric partition, wherein when the first TM enable flag is equal to 0, the encoding method further comprises signaling a first GPM with MVR (GPM-MVR) enable flag for the first geometric partition, wherein the first GPM-MVR enable flag indicates whether the GPM-MVR is applied to the first geometric partition.

* * * * *